April 10, 1951 N. D. PRESTON ET AL 2,548,446

SYSTEM FOR RECEIVING AND DECODING TELETYPE MESSAGES

Filed Feb. 2, 1948 6 Sheets-Sheet 1

INVENTORS
N.D. Preston and F.B. Hitchcock
BY
Neil D. Preston
Their ATTORNEY

April 10, 1951 N. D. PRESTON ET AL 2,548,446

SYSTEM FOR RECEIVING AND DECODING TELETYPE MESSAGES

Filed Feb. 2, 1948 6 Sheets-Sheet 2

INVENTORS

N.D.Preston and F.B.Hitchcock

BY

Neil D. Preston,

Their ATTORNEY

SYSTEM FOR RECEIVING AND DECODING TELETYPE MESSAGES

Filed Feb. 2, 1948 6 Sheets-Sheet 3

INVENTORS
N. D. Preston and F. B. Hitchcock
BY
Neil D. Preston,
Their ATTORNEY

INVENTORS
N.D.Preston and F.B.Hitchcock
BY
Neil D. Preston,
Their ATTORNEY

April 10, 1951 N. D. PRESTON ET AL 2,548,446

SYSTEM FOR RECEIVING AND DECODING TELETYPE MESSAGES

Filed Feb. 2, 1948 6 Sheets-Sheet 5

INVENTORS
N.D.Preston and F.B.Hitchcock
BY Neil D. Preston,
THEIR ATTORNEY

SYSTEM FOR RECEIVING AND DECODING TELETYPE MESSAGES

INVENTORS
N.D. Preston and F.B. Hitchcock
BY Neil D. Preston,
THEIR ATTORNEY

UNITED STATES PATENT OFFICE 2,548,446

SYSTEM FOR RECEIVING AND DECODING TELETYPE MESSAGES

Neil D. Preston and Forest B. Hitchcock, Rochester, N. Y., assignors to General Railway Signal Company, Rochester, N. Y.

Application February 2, 1948, Serial No. 5,694

21 Claims. (Cl. 178—4)

This invention relates to systems for controlling traffic on airways, and more particularly pertains to a novel organization for receiving and decoding messages received over a teletype communication channel.

This application is a continuation in part of our prior application Ser. No. 641,588 filed January 16, 1946, now Patent No. 2,535,954, patented December 26, 1950, our application Ser. No. 528,926 filed March 31, 1944, now Patent No. 2,439,862 dated April 20, 1948, and also our application Ser. No. 621,778 filed October 11, 1945 now Patent No. 2,439,948 dated April 20, 1948; and no claim is intended to be made in this application to any subject matter claimed in said prior applications.

In connection with this invention, it is assumed that every plane operating on the regular airways (except at certain excluded low altitudes) will be required to have a suitable authorization or clearance from a traffic control center to fly at allocated altitudes between designated fixes at certain scheduled times, and that the progress of each flight will be shown by communicating with the control center in some suitable manner, the usual form of overtime report giving the identification of such plane and its time and altitude as it arrives at or passes over each of the fixes in its route.

The primary object of this invention is to provide a system for facilitating and safe-guarding the scheduling of flights and issuance of clearances, in order to permit prompt, accurate and complete advance planning of flight schedules so as to avoid congestion at terminals and the like, and to maintain a suitable time or space separation between flights in the interest of safety.

Considering generally the contemplated organization and plan of operation of the complete system embodying this invention, and without attempting to define the nature and scope of the invention, it is proposed to provide a flight progress board in the traffic control center on which electrically operable changeable indicators may be set by suitable manual and automatic control so as to display the desired data of flight identification, estimated time, altitude, direction and the like for flight schedules which have been authorized by issuance of suitable clearances, the data of such scheduled flights as it is posted on this flight progress board being kept up to date and changed to show the progress of each flight by operating other time indicators to display the overtime as reported for each fix, and also automatically wiping-out the entire posting belonging to the flight in question for the next fix in the rear.

Although the various functions for controlling such a flight progress board may be performed by manual control, the present disclosure is more particularly directed to the provision of means for storing and decoding messages received over the teletype facilities to allow the messages in turn to effect the automatic control of the posting devices. In this connection, the various messages received over the teletype facilities are characterized by the functions which should be performed in connection with such messages. For example, there may be posting messages, overtime messages, wipe-out messages and the like. Each of these different classes of messages require distinctive functions of the automatic control provided in connection with the flight progress board, and it is thus desirable to route each such message to the apparatus particularly adapted to accomplish the functions required by that message. For this reason, each message is identified as to its class by the first symbol or signal of that message designating its type or class. By doing this, the present invention provides that the messages of the different types or classes may be routed to apparatus for performing the functions required for such messages.

In accordance with the present invention, the teletype messages may be received over a communication channel of any suitable type, such as a line circuit, a radio link, or the like. These messages are decoded to an extent to identify their character, and then routed to different perforators for recording the messages by punching successive rows of holes in a tape. This provides facilities for storing a number of messages for any class to allow for the continuous reception of messages over the teletype facilities even though the control of the flight progress board does not keep up with the reception of messages due to the various functions required to be performed in connection with the posting operation in addition to the regular posting operations. This general organization also allows one class of messages to be made superior to another.

When a message is stored on a punched tape, the system is set into operation to transfer that message in its turn to groups of storage and decoding relays which in turn act upon the control circuits for the associated flight progress board. In this connection, it should be noted that the system provides an interlock so as to allow only one message to be decoded at a time even though messages are stored for more than one class at the same time.

The manner in which these decoding functions effect the control of the flight progress board has been shown and claimed in the parent applications previously referred to; and no claim is intended to be made in this application to the composite organization involving the relationships between a teletype receiver and the control apparatus for the flight progress board.

In connection with the automatic posting and wipe-out messages received over the teletype facilities, special provision is made to check the number of characters in these messages, and reject without any posting or wipe-out operation any message which is defective in the number of its characters. Also, any message including an error or correction code character is rejected by the posting apparatus by reason of means which is responsive to the presence of such a code in the message stored in the punched tape. The existence of a defective message is automatically brought to the attention of the operator by a suitable alarm which enables him to take the appropriate action to bring about a proper posting or wipe-out operation.

Also, in connection with the provisions for receiving and decoding overtime messages, means is provided to give a check upon the reception of the proper message by requiring a predetermined number of characters or signals to be included in each overtime message, as well as providing a check with other data already posted before the newly received data may become effective to operate posting indicators for the overtime.

Other attributes, operating characteristics, and advantages of the system of this invention will be in part apparent and in part pointed out as the description progresses.

In describing the invention in detail, reference will be made to the accompanying drawings, in which similar letter reference characters are used to designate similar parts throughout the various figures relating to a particular form of the invention, in which like letter reference characters have been made generally distinctive by use of distinctive preceding or succeeding numerals, and in which:

Figs. 1A to 1D inclusive, when arranged side by side, illustrate the circuit organization for receiving and decoding teletype messages to be used to effect posting and wipe-out operations in a circuit organization for governing a flight progress board;

Figures 1A, 3:
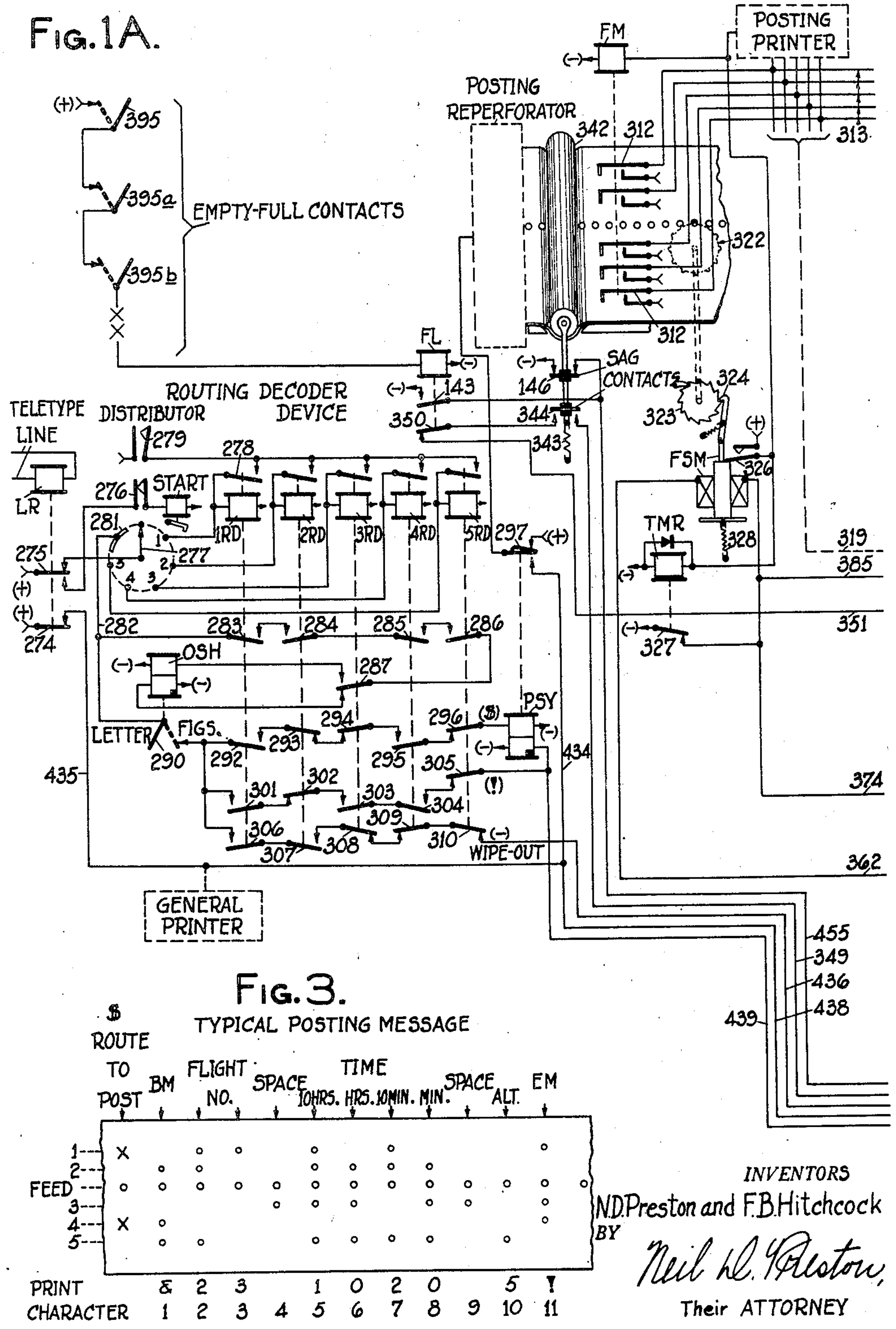
Figs. 3 and 4 illustrate the punchings in the tape for typical posting and wipe-out messages respectively as may be received by the receiving and decoding apparatus of Figs. 1A through 1D.

In describing the invention in detail, reference will be made to the accompanying drawing in which the various parts and circuits for specific embodiments of the invention have been illustrated in a simplified and diagrammatic manner, more with the object of facilitating an explanation and understanding of the nature of the invention and its mode of operation than for the purpose of showing in detail the construction and arrangement of parts that would be preferably employed in practice. In these drawings, various diagrammatic and conventional representations have been employed. The system includes a number of relays mostly of the simple direct current, neutral relays of the usual type and construction, each with a number of contact fingers cooperating to make front contacts and to break back contacts in the usual manner. In the interest of simplifying the showing of the circuits, the contact fingers of the various relays have been shown conventionally either below or above the representation of the relay operating coil or winding and connected therewith by dotted lines, as is most convenient for showing the electrical connections; and these fingers are illustrated as being in the raised or horizontal position when the associated relay is energized and in an inclined or lowered position when the relay is deenergized regardless of whether they are above or below the represented winding.

Also, in order to simplify the showing of the circuit connections, arrows and symbols (+) and (−) are employed to designate the connections to the opposite terminals of an associated battery or other suitable source of current, an operating circuit being established when a conducting path is available from the end of a wire having (+) and an arrow pointing toward the wire to the end of some other wire having (−) and an arrow pointing away from that wire. Various other diagrammatic or schematic representations on the drawings for the various devices will be explained in detail in connection with the consideration of those devices in the following description.

*General organization*

The facilities for receiving and decoding teletype messages for performing the posting and wiping-out operations automatically are diagrammatically illustrated in Figs. 1A through 1D, and comprise in general, a conventional teletype receiver, a selecting or routing means associated with the conventional teletype receiver to route the wipe-out and posting teletype messages to two separate tape reperforators, (i. e. a posting reperforator and a wipe-out reperforator) so that the posting and wipe-out messages are punched in two separate tapes, thereby permitting the use of the wipe-out messages at any time independently of the number of preceding posting messages. This is provided by a suitable interlock to give the desired preference to the messages, as will be later described. Thus, even though the posting panel is full, and additional posting messages may have been received and stored in the tape, the reception of a wipe-out message on a different tape is effective to wipe-out a posting in the posting panel and allow that posting space to then receive the next message stored on the posting tape.

For convenience in simplifying the disclosure, it is assumed that the teletype receiver is of the conventional start-stop type, and that it is associated with a normally energized line circuit which is initially deenergized for the starting pulse and which is then intermittently energized and deenergized thereafter to provide a marking or spacing pulse during one or more of the five successive code transmission intervals comprising one of the symbols or signals included in a message; and these five transmission intervals are followed by the energization of the line and the stopping of the rotary receiver.

Associated with the conventional teletype receiver is the routing decoder device including relays 1RD, 2RD, 3RD, 4RD and 5RD together with a routing control relay PSY for posting messages. The RD relays are of the conventional neutral type; but the routing relay PSY is of the polarized magnetic stick type such as shown in the prior patent to W. D. Hailes et al., Patent No. 1,929,094 dated October 3, 1933.

The posting perforator (or reperforator) is of the usual conventional type, and is shown as being of the single magnet type, such as models 14 and 20 described in the Bulletin No. 162 of the Teletype Corporation.

The apparatus also includes a tape transmitter of the usual conventional type having its own step-by-step tape feed mechanism including magnet FSM for operating the tape at appropriate times past suitable pick up means, such as feeler contacts, to selectively close circuits in accordance with the respective characters represented by the distinctive rows of perforations in the tape.

Also, associated with the tape transmitter is a posting distributor which is provided with a number of different multiple position contactors which may be operated together to their different positions by a step-by-step driving mechanism including magnet DSM adapted to be governed by the stepping operation of the posting reperforator.

Suitable groups of storage or decoding relays are associated with the posting distributor, one group for each different active position of the distributor, and each group includes a separate storage relay for each character of the signal being decoded. The first digit flight number decoder relays have been shown in detail as relays R1, R2, R3, R4 and R5, but the other groups of decoding relays have merely been indicated in block form.

A group of code repeating relays CR1, CR2, CR3, CR4 and CR5 are connected respectively to the bus wires 313 extending to the respective feeler contacts 312 of the tape transmitter, all as indicated by the dotted line 319.

Figure 1B:
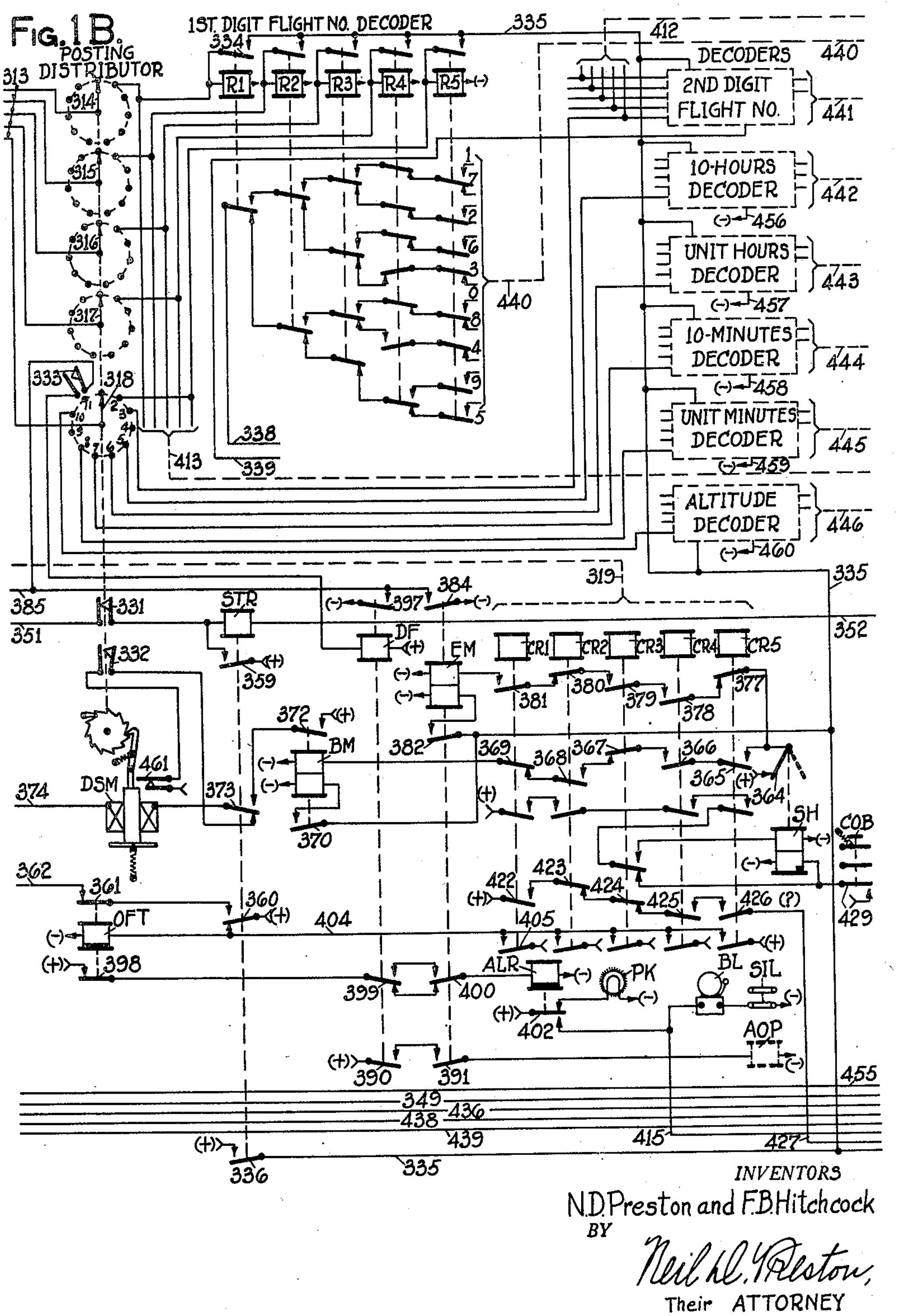
Figure 1C:
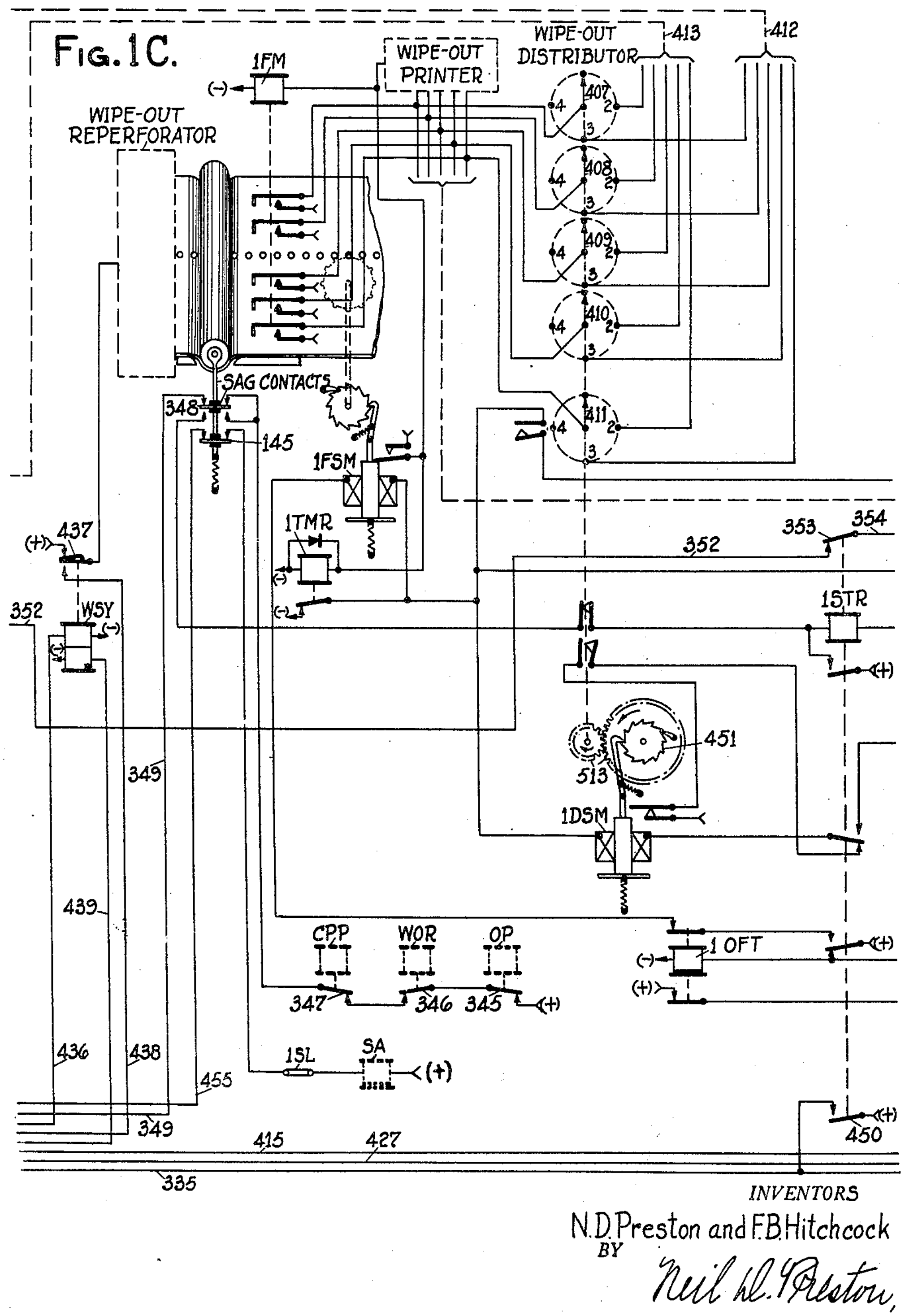

In addition to the posting reperforator, a wipe-out reperforator is shown in Fig. 1C together with a tape transmitter, a wipe-out distributor and associated control devices such as the routing relay WSY. These devices associated with the wipe-out messages are similar in character to those described in connection with the posting messages.

In addition to the devices above mentioned, there are suitable control circuits and relays for interrelating the various devices and their functions as required. Also, there are suitable indication lamps such as PK and WOK, which lamps are normally illuminated. The lamp PK is extinguished whenever an automatic posting operation fails to be completed within a limited time after its initiation or the punched record of a new schedule being posted includes an improper number of codes; the lamp WOK is similarly controlled so as to be extinguished if an automatic wipe-out operation is not completed within a limited time after its initiation, or if the message recorded on the tape includes an improper number of codes. Whenever one of these indicator lamps is extinguished, an audible signal is given to draw an operator's attention to such fact; but this audible signal may be stopped if the operator so desires by actuation of the silencing lever or stay-where-put key SIL. This lever or key SIL is provided so that in the event of some failure being indicated, the audible signal may be silenced until after the fault in the system has been located and eliminated, after which the lever SIL is restored to its normal condition. If the fault indicated by one of the lamps and by the audible signal is immediately apparent, the operation of the clear-out button COB will cause the restoration of the system to a normal condition in which the indicator lamps are re-illuminated and the audible signal is silenced with the operation of lever SIL.

The system organization includes various other devices, and relays, which function in a manner more conveniently considered in discussing typical operations of the receiving and decoding system.

*Reception and decoding of messages for automatic posting and wipe-out*

While posting and wipe-out of flight data in the posting panel of a flight progress board may all be done by manual positioning of setting dials or some equivalent keyset device, and manual actuation of suitable push buttons as previously described in the parent application Ser. No. 621,778, when this flight data is determined in the central office, or reported by telephone, radio, or other communication facilities; provision is preferably made for reasons already noted to perform such posting and wipe-out operations entirely automatically in accordance with messages over a teletype system from outlying fixes or any other points.

In the specific organization of parts and circuits illustrated for performing this automatic posting and wipe-out operation, it has been assumed that the posting and wipe-out messages may be transmitted from any one of a number of different points to a central office by the usual and well known teletype system. Also, while it is evident that a teletype line may be devoted exclusively to such posting and wipe-out messages, it has been assumed that such messages will be transmitted and received over the same line facilities used for communication of other information to the central office, such as general information regarding flights, weather reports, and the like.

Generally speaking, the equipment for receiving and decoding teletype messages to provide automatic posting and wipe-out operations comprises means for segregating and routing posting and wipe-out messages received over the teletype line to separate tape reperforators of the well known type; other means for feeding one or the other of the perforated tapes at the appropriate time past suitable pick-up means, such as feeler contacts, to selectively close circuits in accordance with the respective characters represented by the rows of perforations in the tape; and means for distributing these characters to suitable decoder units to provide for the selective energization of the control buses of the posting panel in conformity with the particular message, and also for automatically initiating a posting or wipe-out operation in substantially the same way as by manual actuation of the push buttons PB and WOB, as described in said parent application Ser. No. 621,778.

The specific arrangement of parts and circuits illustrated assumes the use of the well known stop-start type of teletype system employing a starting pulse, five intelligence pulses in different combinations, and a stop or at-rest pulse. Since the operating characteristics of this teletype system are well known and familiar to those skilled in the art, it will be sufficient to consider here how such system is employed in connection with the automatic posting and wipe-out operations desired for a flight progress board by providing suitable routing and decoding apparatus.

Referring to Fig. 1A, the relay LR represents the normally energized line relay for the usual teletype line, which is initially deenergized for the start pulse, and which is then intermittently energized and deenergized thereafter to provide marking or spacing pulses during one or more of the five successive code transmission intervals, but which is finally held in its energized position for the stopping pulse or at-rest period. A front contact 274 of this line relay LR is employed for operating single magnet reperforators, such as models 14 and 20 of the Teletype Corp., and also a single magnet general printer shown schematically in block form and preferably a tape recorder such as model 14 of the Teletype Corp.

In connection with the reception of posting and wipe-out messages, it is contemplated that these messages will be identified at the beginning by a distinctive routing character, such as the ($) sign for posting and (—) for wipe-out, followed by a begin-message character such as the "and" symbol (&); and further that each of these messages comprises a predetermined number of characters and is terminated by an end-of-message character, such as the exclamation mark (!). The routing characters ($) and (—) serve to route the messages to the appropriate posting or wipe-out reperforator, and the begin-message and end-of-message characters are employed for decoding and checking the integrity of the messages, in the manner later explained.

*Message routing and perforating.*—For the purpose of routing posting and wipe-out messages identified by the distinctive routing characters preceding each message to the separate reperforators, a routing decoder device has been shown diagrammatically to facilitate an explanation and understanding of the routing functions although it will be seen that appropriate contacts operated by the selector bars or the like of a regular teletype printer may be employed to govern the reperforators in the same way.

Referring to Fig. 1A, the routing decoder device diagrammatically illustrated is controlled by front and back contacts 275 of the line relay LR, and in general comprises a motor-driven rotary distributor with a start magnet, which is set into operation by energization of the start magnet by an obvious circuit through back contact 275 of relay LR contacts 276 closed with the distributor in the initial position only, contact 279 opened in the initial position only, and a contact arm 277 which moves during rotation of the distributor to connect five decoder relays 1RD, 2RD, etc., to the front contact 275 of the line relay LR, so as to permit selective energization of these decoder relays in accordance with marking or code pulses. These decoder relays 1RD, 2RD, etc., are held up by locking or stick circuits, including contacts such as front contact 278 for relay 1RD, and the contact 279 of the distributor which is open only in its initial position. Thus, the routing relays RD are selectively energized during each series of marking pulses for a character and those of such relays which are picked up remain stuck up until the distributor contact 279 opens at the end of the series following the execution period which is defined while arm 277 is on segment 281. During movement of the distributor from its fifth position to the initial position, its contact arm 277 wipes over a contact segment 281 to provide an execution circuit to govern the energization of a shift relay OSH, posting symbol relay PSY, and also a wipe-out symbol relay WSY in Fig. 1C, dependent upon the character transmitted and stored in the decoder relays 1RD, 2RD, etc. at the time.

The shift relay OSH and the relays PSY and WSY governed by this routing decoder are assumed to be of the magnetic stick type operating their contact fingers to one position or the other depending upon which winding of the relay is momentarily energized, and holding their contact fingers in the last operated position until again energized. A relay of this type is disclosed for example in the patent to Hailes et al., No. 1,929,094 dated October 3, 1933.

When the transmission of teletype messages includes the usual marking pulses 1–2–3–4–5 for shift to letters or the lower case and selectively picks up the routing relays 1RD, 2RD, 3RD, 4RD and 5RD in accordance with such code, the upper winding of the shift relay OSH is energized by a circuit readily traced from (+), through front contact 275 of relay LR, distributor arm 277 and contact sector 281, execution wire 282, front contacts 283 through 287 of relays 1RD, 2RD, etc. upper winding of relay OSH, to (—). The closure of this circuit thereby positions the contact finger 290 of this relay OSH to the left-hand position shown. When the usual character of marking pulses 1–2–3–4–5 is received corresponding to the code assigned to the figure shift, the other lower winding of the relay OSH is energized momentarily during the execution period by a circuit similar to that just traced, but including a back contact 287 of decoding relay 3RD, thereby shifting the contact finger 290 of the relay OSH to a right-hand dotted line position, and provide circuit connections to the selecting circuits through the contact of the routing relays 1RD, 2RD, etc. to the windings of the relays PSY and WSY.

Assuming the symbol ($) has been chosen to identify a posting message, transmission of marking pulses 1–4 for this character while the shift relay OSH has been set for figures, causes energization of the upper winding of the relay PSY through front contacts 292, 295 of relays 1RD and 4RD and back contacts 293, 294, 296 of relays 2RD, 3RD and 5RD. This energization of the upper winding of relay PSY acts to shift its contact finger 297, having make-before-break contacts shown conventionally, from the upper position to the lower position, disconnecting the single magnet (not shown) of the posting reperforator from steady (+), and connecting it over wires 434 and 435 to (+) through the front contact 274 of the line relay LR. This operation occurs while the line relay LR is energized during the execution and at-rest periods; but when the relay LR is deenergized by the start pulse for transmission of the next character of the posting message, the reperforator is operated in the usual way to perforate the tape in accordance with such character.

In the type of posting message contemplated, the symbol ($) identifying such a message is followed by the beginning-of-message character, which is punched in the tape; and this character is followed by the transmission of characters, with such spaces or other punctuation as desired, to represent the flight identification, schedule time, altitude or the like, such as indicated in Fig. 3 for a typical posting message. The message is terminated with a suitable end-of-message character assumed to be (!), which is punched in the tape. The setting of the decoder relays 1RD, 3RD and 4RD in accordance with this end-of-message symbol (!) provides a restoring circuit through the lower winding of relay PSY through the contacts 301, 302, 303, 304 and 305 of the decoding relays; and the relay PSY is thus restored to the normal position shown during the execution period to open back contact 297 and disconnect the posting reperforator from the line relay LR and steadily energize its selector magnet.

In a similar manner, the contact 437 of relay WSY in Fig. 1C is operated by current flow over contacts 306, 307, 308, 309 and 310 of relays 1RD, 2RD, etc. and wire 436 in response to the transmission of the character (—) chosen to identify a wipe-out message to close a circuit over wires 435 and 438 for control of the wipe-out reperforator by contact 274 of the line relay LR; and the wipe-out reperforator is operated in the same manner until the end-of-message character (!) is received and punched in the tape, at which time energy is supplied over wire 439 to restore the relay WSY, the circuit connections performing these operations being similar to those previously described and not requiring detail explanation.

The system thus operates to route posting and wipe-out messages to separate reperforators where they are reproduced and stored in punched tapes until used to perform posting and wipe-out operations for the posting panel. As already noted, the number of new flight schedules transmitted and stored in the punched tape may at times exceed the capacity of the posting panel; but the wipe-out messages are stored in a separate tape and may be used to wipe-out schedules no longer needed in the posting panel and create vacant spaces as necessary, which would not be true if these wipe-out messages appeared in the same tape as used to store the new flight schedule or posting messages.

*Decoding and using posting messages.*—This operation involves feeding the perforated tape automatically at the appropriate time through a suitable pick-up device (or tape transmitter) to energize the relays of the decoder units in accordance with the significant characters of this message; and if the number of characters in the message conforms with the prescribed number, and the message is properly terminated with the end-of-message character (!), then the posting operation is automatically performed in substantially the same way as when the push button PB is operated with the exception that the energization of the control buses for the posting panel is determined by the decoder units. This has been shown and described in the patent application Ser. No. 621,778.

The type of pick-up means used and shown diagrammatically comprises five feelers 312 adapted to drop into corresponding holes in the tape to close a contact when a feeler magnet FM is deenergized. These feeler contacts 312 govern the energization of five buses 313 connected to the five contact arms 314, 315, 316, 317 and 318 of a posting distributor, and also connected to five code repeater relays CR1, CR2, CR3, CR4 and CR5 as indicated by the dashed line 319 (see Fig. 1B). A special printer for recording the posting messages is also preferably connected to these same buses 313, this printer being of the multiple magnet selector type, and having an execution or printing circuit connection in multiple with the feeler magnet FM.

The means for feeding the tape intermittently past the feelers 312 is illustrated diagrammatically as a feed wheel 322 having teeth engaging the usual feed holes in the tape, and this feed wheel 322 is suitably connected, as indicated by dotted lines, to a ratchet wheel 323 adapted to be advanced by a feed stepping magnet FSM. The energization of this tape feed stepping magnet FSM engages its pawl 324 with the next tooth of the ratchet wheel 323 and also closes contacts 326 to provide an energizing circuit for the feeler magnet FM readily traced to raise the feelers 312. The closure of these contacts 326 also energizes a timing relay TMR, preferably made relatively quick to pick up and slow to release by the use of a conventional rectifier as shown. The energization of the timing relay TMR and opening of its back contact 327 deenergizes the feed stepping magnet FSM to allow the biasing spring 328 to pull down the pawl 324 and advance the ratchet wheel 323 and feed wheel 322 to move the tape on space, and bring the next row of punched holes under the feelers 312 all in a manner which can be readily seen without further explanation. The stepping operations produced by this arrangement are at a rate to feed the tape slower than the tape is fed by the posting reperforator when it is in operation.

The posting distributor as shown diagrammatically, comprises five contact arms 314, 315, 316, 317, and 318 engaging fixed contacts in as many different positions as there are characters in the posting message or flight schedule data to be posted, such as 11 in the case of the typical posting message indicated in Fig. 3. These contact arms 314 through 318 of the posting distributor are moved together by a distributor stepping magnet DSM of the same type described from each contact position to the next when this magnet is deenergized. The posting distributor also includes contacts 331 shown diagrammatically which are closed only when the distributor is in the initial or first position, other contacts 332 opened only when the distributor is in this initial position; and other contacts 333 closed temporarily while the distributor is in its last active position corresponding with the last or end-of-message character in the prescribed posting message.

The posting distributor governs the selective energization of the relays of a plurality of decoder units, one for each digit or character of the flight data to be posted. These decoder units are alike, so that only one for the first digit of the flight number has been illustrated in detail, the others being indicated schematically in block form. The typical decoder unit shown comprises relays R1 to R5 connected to contacts of the different distributor arms 314, 315, 316, 317 and 318 respectively in the first active position corresponding with the second character of the message. It can be seen that these relays 1 to 5 are seelctively energized in accordance with the energization of the buses 313 by the feeler contacts dependent upon the punched holes in the tape while the posting distributor is in such first active position, and the selective energization of these relays 1 to 5 establishes ten different circuit connections 0 to 9 inclusive for selective energization of the corresponding group of control buses for the posting panel. The relays 1 to 5 are maintained energized by stick or locking circuits through front contacts such as the contact 334 of a relay 1 and a master stick bus 335 to which energy is applied from (+), through a front contact 336 of a start relay STR, or through a front contact 450 for a start relay 1STR associated with the wipe-out distributor.

As shown in Fig. 1B, the circuit connections established by the decoder for the first digit of flight number are made available for controlling the posting apparatus over a wire 338 and a cable 440 having ten wires. Similarly, the circuit connections established by the decoder for the second digit of flight number are made available for controlling the posting apparatus over a wire 339 and a cable 441 also having ten wires. Each of the other decoding units have decoding contact pyramids adapted to control the posting apparatus over suitable cables such as 441, 442, 443, 444, 445 and 446. The details of the circuit connections and the conditions under which they function to control the posting apparatus are fully described in the above mentioned parent application Ser. No. 621,778, now Patent No. 2,439,948.

The apparatus asociated with the wipe-out reperforator as in Fig. 1C is of the same character, and operates in the same manner, and the corresponding parts are conveniently designated with the same reference letters with the prefix 1.

Figure 4:
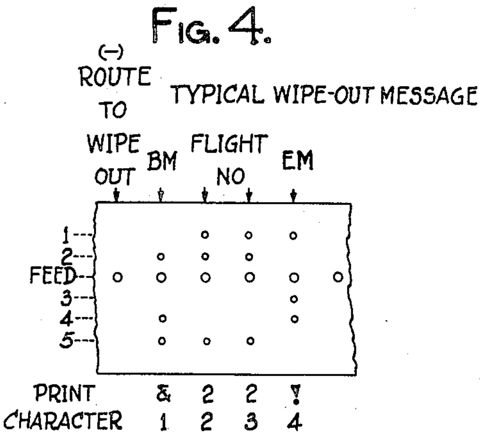

The wipe-out message, however, as indicated in Fig. 4, merely includes the flight identification number for the flight schedule to be wiped-out; and for convenience the same decoder units for flight number are controlled by the wipe-out distributor as the posting distributor, this joint use necessitating the special control by relays AWO and SF as described in the parent application (above mentioned). Obviously, separate decoder units for flight number could be used for the wipe-out apparatus, if desired.

*Typical automatic posting operation.*—Let us assume that the system is in the normal inactive position shown, and that a typical posting message, such as indicated in Fig. 3, is punched in the tape by the posting reperforator during the reception of a posting message. As the tape is fed through the reperforator in connection with this punching operation, a sag develops in the tape between this reperforator and the tape feed wheel 322; and a suitable roller 342, or the like, resting on the tape and biased downward by a spring 343, moves downward as this sag develops to close a contact 344 and establishes a circuit for energizing the start relay STR. This circuit may be traced from (+), Fig. 1C, through back contacts 345, 346, 347 of relays OP, WOR and CPP respectively, a sag contact 348 of the same type for the wipe-out tape in the position shown when there is no wipe-out message punched in this tape, wire 349, sag contact 344 for the posting tape, back contact 350 of full relay FL, wire 351, contacts 331 of the posting distributor in its initial position, windings of relay STR in Fig. 1B, wire 352, back contact 353 of relay 1STR in Fig. 1C, wire 354, back contact 355 of relay ER, wire 356, back contact 51 of completion relay CP, a normally closed contact of the clear-out button COB, and back contact 52 of relay SQ. to (—)

The start relay STR when thus energized is held up by a stick circuit through its front contact 359, which stick circuit maintains relay STR energized independently of the opening of contact 331 during operation of the posting distributor.

The energization of the start relay STR and closure of its front contact 360 in Fig. 1B establishes an operating circuit for the tape feed stepping magnet FSM in Fig. 1A, this circuit being traced from (+), through front contact 360 of relay STR, front contact 361 of an overfeed tape relay OFT, wire 362, stepping magnet FSM, and back contact 327 of time relay TMR, to (—).

The stepping magnet FSM is thus set into operation to advance the tape intermittently past the feeler contacts. Assuming the posting message under consideration is the first one received since the last posting operation, the tape has to be fed by repeated operations of the stepping magnet FSM for the distance between the punched holes made by the reperforator and the feeler contacts in order to bring the first row of holes punched in the tape under the feelers. When this occurs, feeler contacts for positions 2, 4 and 5 are closed since there are punched holes for such positions for the begin-message character assumed; and this energizes the code repeater relays CR2, CR4 and CR5 to establish a circuit through the upper winding of a begin-message relay BM, which circuit may be traced from (+), through a contact 364 of a shift relay SH in the upper case or "figures" position shown through front and back contacts 365—369 of relays CR1, CR2, etc. now set for the "begin-message" character, upper winding of relay BM, to (—). The relay BM once energized is maintained energized by a stick circuit through its front contact 370 and the master stick bus 335 now energized through front contact 336 of relay STR. Relay SH is of the magnetic stick type and normally assumes the figures position during posting operations, but is operated under special message conditions hereinafter described.

This operation of energizing selected code repeater relays CR2, CR4 and CR5, and energization of relay BM occurs after the feed stepping magnet FSM is deenergized to open its contacts 326 and release the feeler magnet FM to close the feeler contact 312; and the timing relay TMR is made sufficiently slow releasing to permit such energization of these relays before back contact 327 of relay TMR closes to permit the next energization of the stepping magnet FSM and closure of its contacts 326 and energization of the feeler magnet FM to open the feeler contacts. When the timing relay TMR releases before the next operation of the feed stepping magnet FSM, the energization of the relay BM provides a circuit through its front contact 372 and front contact 373 of the start relay STR to the distributor stepping magnet DSM, wire 374 and back contact 327 of relay TMR, so that the posting distributor is operated from the position shown to the first active position in synchronism with feeding the tape from the punchings forming the begin-message character to the punchings representing the first digit of the flight number.

Consequently, the selective operation of the feeler contacts in accordance with this first digit of the flight number is distributed to the relays of the decoder unit for the first flight number digit, selectively energizing these relays to establish circuit connections to connect (—) to a control bus of the posting panel in conformity with the first digit of flight number punched in the tape.

The same operation of the tape feed stepping magnet FSM and distributor stepping magnet DSM continues for the other characters of the flight data punched in the tape to store this data in the appropriate decoder units. If, as indicated in Fig. 3, the significant characters for flight data are separated by spaces or other punctuation, the corresponding points such as 4 and 9 on the posting distributor are idle positions not connected to any decoding unit. It can be seen that the posting message or schedule data may comprise any desired number of characters, with spaces or other punctuation as desired, by employing a distributor having the proper number of active contact positions; and it should be understood that the posting message or schedule data indicated in Fig. 3 is merely typical or representative of flight schedules of this nature.

As previously noted the posting message for checking purposes is preferably designated with a special end-of-message character such as (!); and when the punched holes for this character are brought under the feelers by the deenergization of the feed stepping magnet FSM, the energization of the repeater relays CR1, CR3 and CR4 for this end-of-message character provides a circuit from (+), through polar contact 364 of relay SH in the figures position shown, contacts 377 through 381 of these code repeating relays to energize the upper winding of the end-of-message relay EM, which is then stuck up through its lower winding and front contact 382 by energy from the master stick bus 335.

The energization of the end-of-message relay EM in this way closes a front contact 384 to connect (—) over wires 385 and 374 to the stepping magnets FSM and DSM in multiple with the back contact 327 of the timing relay TMR, so that these stepping magnets FSM and DSM remain energized with their pawls engaged within the next teeth of their ratchet wheels, even though the relay TMR is energized. In other words, energization of the end-of-message relay EM establishes a locking circuit to hold the tape feed and distributor in the position for the last character terminating the message.

Assuming that the message includes the proper number of characters, the distributor is in its last active position at this time when the relay EM is energized, and the closure of the contacts 333 with the distributor in this position provides an energizing circuit for a relay DF from (+), through the winding of the relay DF, contacts 333 of the distributor, wire 385, initially through back contact 327 of relay TMR and later through front contact 384 of relay EM, to (—).

The energization of both the relays DF and EM establishes a circuit from (+), through their front contacts 390 and 391 to energize the automatic posting relay AOP, which acts to post the data stored in the coder units in the posting panel in much the same way as when the relay OP is energized for a manual posting operation.

The various operations initiated by the energization of the automatic posting relay AOP are fully described in the parent application Ser. No. 621,778 and reference should be made to that disclosure for a complete understanding of the manner in which the code receiving and decoding apparatus of the present disclosure acts with respect to a posting panel. It is believed to be sufficient for an understanding of the present disclosure to know that the contact pyramids on the decoding relays are rendered active to govern the associated posting apparatus upon the picking up of the automatic posting relay AOP subject to various conditions explained in the parent application.

Thus, whenever a code in the punched tape representing a particular number for the first digit of flight number acts to energize these decoding relays, negative energy (—) is applied to a correspondingly numbered bus for the first digit of flight number; and the particular bus thus energized acts to position the flight number indicator for this digit for the proper space as selected in a manner previously described in connection with manual posting.

In a similar manner, the ten different buses for the second digit of flight number have been indicated by the dotted line 441 as connected to the decoding apparatus associated with the second digit of flight number. These buses are controlled by decoding contacts on their respective decoding relays in the same manner as disclosed for the first digit of flight number, and negative energy (—) is supplied to the proper bus in the same way. The different sets of buses for time and altitude are indicated by dotted lines 442, 443, 444, 445 and 446 as extending to the decoding contacts of their respective decoders in Fig. 1B, and are energized in a similar way.

It might be noted that during this automatic operation the various manually operable dials (shown in the parent application) are in their blank positions, but even though they are inadvertently left in operated positions they can not be effective during an automatic operation since the relays OP and OPR are not energized during this operation.

When the indicators for the selected space have been properly positioned, the completion relay CP is energized in the same way as for a manual posting operation previously described, and this relay opens at its back contact 51 (Fig. 1D) the stick circuit for the start relay STR, which releases and opens its front contacts 360 and 373 to deenergize the tape feed and distributor stepping magnets FSM and DSM to advance the tape one space and restore the distributor to its initial position. The release of the relay STR and opening of its front contact 336 also deenergizes the master stick bus 335 to release the relays EM, BM, and various relays of the decoder units then energized.

When the completion relay CP again releases to close its back contact 51, the energizing circuit for this start relay STR is again prepared, and if in the meantime another posting message has been stored in the tape the sage contact 344 is closed, so that the start relay STR may again be energized to repeat the same operation for this subsequent message, and so on until all of the messages in the stored tape have been automatically posted. In this connection, it is assumed that the reperforator is provided with a ratchet or friction tape feed control device, so that the tape feed stepping magnet FSM and its associated feeder wheel 322 may pull the tape through the reperforator without interference to bring the last row of punched holes of a message under the feelers.

If desired, the tape reperforator may be of the type shown in the Patent No. 2,252,852 granted August 19, 1941, to Ray Hoover, in which means is provided for automatically feeding out blank tape after the reception of each message, thereby making it unnecessary to pull blank tape through the reperforator to bring the last row of holes of a message under the feelers as above described. When this type of tape reperforator is employed, the amount of blank tape fed out after a message is adjusted to be just sufficient to allow the last row of punched holes for that message to come under the feelers 312. This amount of blank tape is determined by the distance between the reperforator punches and the feelers 312. This automatic feeding of the blank tape at the end of a message does not unnecessarily actuate the sag contacts because the tape thus automatically fed out is used up by the tape transmitter in bringing the last row of holes of that message under the feelers 312.

It may be pointed out here that, when all of the spaces of the posting panel are filled, and empty-full contacts 395 for all of the spaces are shifted from their full to their dotted line positions, a circuit is made up through these contacts 395, 395*a*, etc. in series, as shown in Fig. 1A to energize the full relay FL which opens its back contact 350, shown in Fig. 1A, in the energizing circuit for the start relay STR, so that in spite of the closure of the sag contact 344 due to the storage of posting messages in the tape, the start relay STR is not energized to initiate any further decoding and posting operation. As soon as a vacant space is created in the posting panel by some manual or automatic wipe-out operation, the full relay FL is released to close its back contact 350 and permit energization of the start relay STR to effect the automatic posting of the next message stored in the tape.

*Check on integrity of a posting message.*—It can be seen that the positioning of the indicators in the posting panel is dependent upon the energization of the associated control buses, which in turn are governed by the decoder unit; and since these decoder units respond to any punching of holes in the tape for corresponding positions of the posting distributor, it is important for proper posting operation that the characters of flight number, time, and altitude should appear in the tape at the proper points with respect to the position of the distributor, otherwise erroneous and false data may be posted. For these reasons, it is proposed to employ a posting message or flight schedule message of a uniform and prescribed number of characters, starting with a begin-message character and ending with an end-of-message character, and to organize the tape feed and distributor equipment in such a way that an abnormal message lacking this prescribed number of characters will not be posted.

Referring to Fig. 1B, it can be seen that the automatic posting relay AOP is energized only if both relays DF and EM are energized to close their front contacts 390 and 391. The relay EM is energized by the end-of-message character, and the relay DF by the contacts 333 of the distributor closed only in its last active position. If the end-of-message character and the last position of the distributor occur concurrently, the relay AOP is energized to perform an automatic posting operation. Since the distributor is started by the energization of relay BM in response to the begin-message character, it can be seen that if the message lacks the proper number of characters, the concurrent energization of relays DF and EM does not occur, and there is no automatic posting operation.

Considering this checking feature more in detail, suppose some one of the prescribed characters of a posting message are omitted for some reason, perhaps by careless manipulation of the transmitting key board, then the end-of-message character (!) is registered by the energization of the relay EM and the tape feed and distributor stepping magnets FSM and DSM are locked up as previously described, before the distributor reaches the last active position to close its contacts 333 and energize the relay DF.

Similarly, if an extraneous character is introduced into the posting message in some way, the distributor reached its active position and closes contacts 333 to energize relay DF to lock the feed stepping magnet FSM by closure of front contact 397 of relay DF, before the end-of-message character has been reached on the tape to energize relay EM.

In both of these cases, the relay AOP is not energized, and there is no automatic posting operation, nor energization of the completion relay CP to release the start relay STR. In short the system stalls.

In addition to creating this stalled or locked-up condition of the system in the case of a defective message, a suitable alarm is automatically given by the deenergization of the alarm relay ALR. The relay ALR is normally energized from (+), through front contact 398 of the relay OFT and back contacts 399 and 400 in series of relays DF and EM respectively, relay ALR, to (−). When the relays DF and EM are both energized at the end of a proper message, the relay ALR is maintained energized by a circuit through the front contacts 399 and 400 of these relays; but if either relay EM or DF is energized without the other, as in the case of a defective message, the energizing circuit for relay ALR is broken, and it releases to open at its front contact 402 the circuit to a suitable indicating lamp PK and to close at its back contact 402 a circuit to a bell BL, buzzer or other suitable audible alarm, adapted to be silenced by operation of a silencing lever or key SIL.

In this way, the fact that the system has stalled on account of a defective message is brought to the attention of the operator, and he may then examine the last message as printed by the posting printer to see if he can discover the difficulty. After such inspection of the message, as printed, he may call for further information or a repeat of the posting message, or take such other action as may be appropriate under the conditions. After such investigation of the situation, the operator by actuation with a clear-out button COB in Fig. 3D opens the stick circuit then holding the start relay STR energized, thereby restoring the apparatus to the normal condition; but there has been no automatic posting of the data represented by the defective message.

If the operator from inspection of the printed record can determine what the correct message should be, he may make the proper posting manually by positioning the setting dials and then actuating the posting push button PB, as described in the parent application Ser. No. 621,778. He can also manually make the correct posting or wipe-out operation after suitable communication with the person having transmitted the faulty teletype message. The important fact is that there has been no erroneous or faulty posting of the defective message.

*Tape over-feed prevention.*—From the foregoing explanation, it can be seen that the tape feed stepping magnet FSM is started when the closure of the sag contact 344 shows a message has been punched in the tape, and that this tape feed is stopped by the end-of-message character, or if the distributor is advansed to its last active position following reception of the begin-message character. If a message, which is without the appropriate begin-message character, should happen to be punched in the tape by the reperforator, due to careless manipulation by an operator or otherwise the tape feed mechanism would continue in operation and perhaps pull out all of the tape.

To avoid this contingency, an over-feed tape relay OFT is preferably provided, which is normally energized through a back contact 360 of the start relay STR, and may also be energized over a bus 404 through front contacts of any one of the code responsive relays CR1, CR2, etc., such as the front contact 405 of the relay CR1. This relay OFT is made sufficiently slow releasing by any one of the well known expedients, as indicated by its heavy base line, so as to maintain its armature in the attracted position for the relatively short time required for the tape feed device to advance the tape far enough to bring the first row of punchings made by the reperforator under the feelers. So long as there are punchings in the tape to actuate one or more of the feeler contacts and energize one or more of the code repeating relays CR1, CR2, etc. the relay OFT is maintained energized; but when tape without any punchings is pulled past the feelers by the tape feed mechanism, then the intermittent energization of the relay OFT ceases, and this relay OFT in time releases to open its front contact 361 included in the energizing circuit for the tape feed stepping magnet FSM, and at the same time to open its front contact 398 to de-energize the alarm relay ALR. The operator, thus advised of the situation, can by actuation of the clear-out button COB release the start relay STR to restore the apparatus to normal for subsequent operations.

*Automatic wipe-out operation.*—Automatic wipe-out teletype messages routed to the wipe-out reperforator and punched in a separate tape are employed in substantially the same manner as posting messages to cause an automatic wipe-out operation for the posting panel. The apparatus and circuit organization for accomplishing such automatic wipe-out operation are in effect a duplication of those for the automatic posting operation previously explained; and for convenient reference, the more significant parts of this wipe-out apparatus are given the same reference letters and numbers with the prefix 1. In view of this marked similarity in the structure and mode of operation, it would appear to be unnecessary to review the automatic wipe-out operation in detail, limiting consideration to some of the points of difference.

Since a wipe-out operation merely requires identification by flight number of the schedule to be wiped-out, a wipe-out teletype message requires merely the flight number identification, as indicated for a typical message in Fig. 4, together with a suitable begin-message character and an end-of-message character, which for convenience are assumed to be the same as those used for posting messages. Consequently, a wipe-out message comprises a smaller number of significant characters than the posting message, four being required for the typical wipe-out message shown in Fig. 4; and accordingly, the five arms 407–411 of the wipe-out distributor have only four active positions. If these four active positions are distributed for one complete revolution of the distributor arms, as in the arrangement shown, it is considered desirable to employ suitable gearing 513 between this distributor and the stepping magnet ratchet wheel 451 so that such stepping structure may have any convenient number of stepping positions.

Figure 2A:
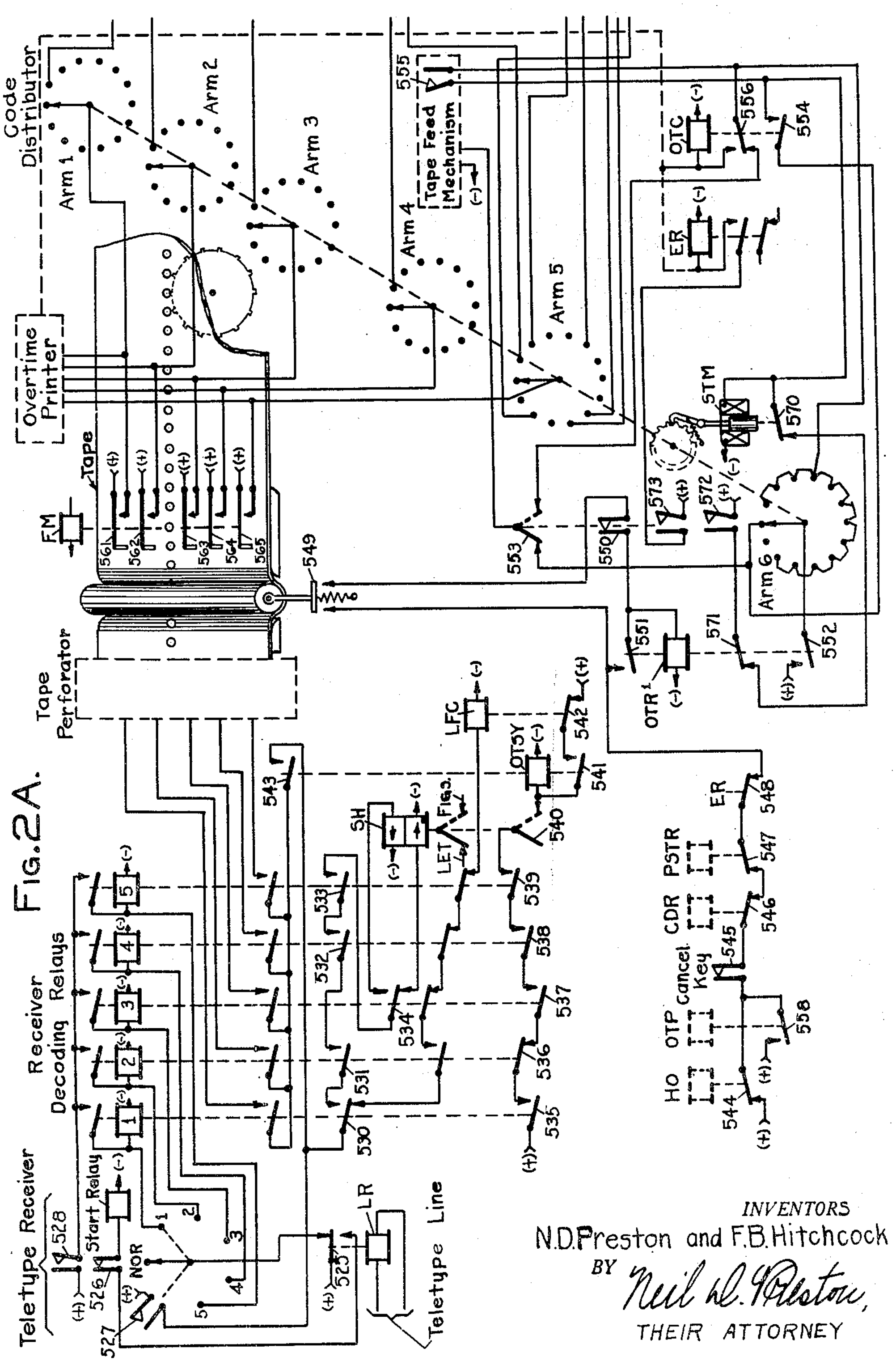
Figs. 2A and 2B illustrate the apparatus and circuits employed, when arranged end to end, for receiving and decoding teletype messages to be used to effect overtime posting operations in a circuit organization for governing a flight progress board.

Since decoder units for the different digits of flight number, with their connections to the control buses of the posting panel, are required for the automatic posting operation, it is convenient to use these same decoder units for the automatic wipe-out operation, by connecting the contact points for the distributor arms 407–411 to the relays of these decoder units by buses as indicated by the dash lines 412 and 413. For this reason, it is necessary to provide the back contacts 418 and 419 of the relay AWO and back contacts 119 and 120 of relay SF as shown in Fig. 2A of the parent disclosure to control the connection from (—) to the flight number decoder unit for the first digit and also similar contacts for the second digit flight number decoder unit, in a manner not required for the other decoder units, in order to disconnect (—) from the contacts of these flight number decoder units, when the relay AWO is energized for an automatic wipe-out operation, as soon as the relay SF is energized by location of the schedule to be wiped-out, so as to deenergize the flight number control buses of posting panel and permit blanking of the flight number indicators for such wipe-out operation. The other decoder units have their selected bank of contacts connected directly to (—), i. e. their wires corresponding to wires 338 and 339 are connected to (—) as indicated by wires 456, 457, 458, 459 and 460.

At the end of the operation of decoding a wipe-out message of the proper number of characters terminated by the end-of-message character, the concurrent energization of relays 1DF and 1EM cause energization of the automatic wipe-out relay AWO in the same way as the automatic posting relay AOP is energized. Generally speaking, the energization of the relay AWO results in a wipe-out operation in substantially the same way as when the relay WOR is energized by manual actuation of the button WOB, the flight number of the posting to be wiped-out, however, being that set up in the flight number decoding units, instead of that set up on the manually operable setting dials.

The energization of the relay AWO initiates the wipe-out operation in connection with the posting panel in a manner specifically described in the parent application Ser. No. 621,778, and reference should be made to that disclosure for such details. It is sufficient for an understanding of the present disclosure to know that once the wipe-out operation is initiated and the particular posting space has been located by the flight number as decoded by the flight number decoding relay groups of Fig. 1B, the operation of a same flight relay SF (not shown) acts to remove the negative energy from the flight number buses as applied by the decoding contacts of the decoding relay groups. This allows the flight number indicators as well as all other indicators of the selected space on the posting panel to be restored to their normal blank positions.

The alarm relay 1ALR and operation of its contact finger 414 actuates the same bell BL or audible signal over a circuit including wire 415, but extinguishes a different indicating lamp WOK, to enable the operator to tell whether the abnormal operation causing the audible signal relates to the posting apparatus or the wipe-out apparatus.

The various features of the automatic wipe-out operation in other respects are the same as those previously explained for the automatic posting operation, and can be readily understood from this previous explanation. For example, the energization of the start relay 1STR by closure of the back points of the sag contact 348 for the wipe-out tape causes the feeding of the tape and operation of the wipe-out distributor. This in turn energizes relay 1BM and 1EM at the beginning and end of the message and so on, involving the same circuit connections as previously described, except for obvious minor differences, such as the omission of the back contact 350 of the full relay FL from the energizing circuit for the start relay 1STR governing the wipe-out operation.

*Rejecting corrected messages.*—In the transmission of a posting or wipe-out message over a teletype system by manipulation of the keyboard in the usual way, the sending operator may realize or notice an error in transmission before the message is completed, perhaps from observation of the printed record made before him during the transmission. In such a case, the operator may avoid unnecessary stalling of the system for a defective message, or prevent posting of wrong data, by transmitting a suitable error symbol, such as the character (?) comprising marking impulses 1—4—5. When a message punched in the tape and including such an error character is fed past the feeler contacts, this error character energizes code repeater relays CR1, CR4 and CR5 (see Fig. 1B) to close a circuit readily traced from (+), through front contact 422 of relay CR1, back contact 423 of relay CR2, back contact 424 of relay CR3, front contact 425 of relay CR4, and front contact 426 of relay CR5, wire 427, relay ER in Fig. 1D, to (—). This energizes relay ER to open its back contact 355 to interrupt the stick circuit then maintaining energized either the relay STR or 1STR, as the case may be. The effect of this is to reject this message. As a result of such de-energization of the relay STR, for example, the tape feed stepping magnet FSM stops, and the distributor stepping magnet DSM is operated by a circuit including interrupter contacts 461, off-normal contacts 332, and back contact 373 of relay STR, until the distributor has been returned to its initial position. The relay STR may then be again energized to initiate another operation during which the succeeding new and correct message may be decoded and posted.

This same operation is characteristic of the wipe-out apparatus.

This method of correcting the message is, of course, applicable only if the sending operator knows of the error and sends the error character before the message is completed; but this feature does afford operators the facilities of correcting messages during transmission and avoid false posting or wipe-out operations, or the unnecessary stalling of the system for a defective message, that might otherwise occur.

*Other teletype messages for the operator.*—In addition to transmitting and decoding posting and wipe-out messages for automatically controlling the indicators in the posting panel, it is contemplated that conditions are likely to exist where it is desirable to bring to the attention of an operator, supervising the movement of flights, other kinds of special messages about approaching flights coming under his jurisdiction, such as priority rights, operating limitations of certain flights, and the like.

Special messages of this character may be transmitted over the teletype facilities in the regular way and routed to the posting reperforator by sending the appropriate routing character, and if such message lacks the prescribed begin-message character such as the "and" sign (&), the posting distributor and decoder units will not respond to the characters of such a special messages. This special message in the tape, however, will be printed on the printer governed by the feelers for the inspection of the operator. This special message should be terminated with the prescribed end-of-message character (!) which will cause energization of the relay EM to lock the tape feed stepping magnet FSM in the same manner previously described, and give the visual signal and audible alarm to attract the attention of the operator to this special message. The operator can then restore the system to normal by actuation of the clear-out button COB in the regular way.

In connection with this operation, the shift relay SH is governed by the code repeater relays CR1, CR2, etc. energized by the feeler contacts so that when such special message involves letters and a regular shift character for the lower case is transmitted and punched in the tape, this shift relay SH will respond to such punchings by obvious circuit connections the same as for shift relay OSH, to shift its contact finger 364 from the closed position shown to the dotted line position, and thereby prevent energization of either relay BM or EM by the same marking pulses used for letters as those for the particular characters intended to energize these relays. Under normal operating conditions, a special message is terminated by the end-of-message character (!) which involves a prior transmission of the usual character for upper case or figure shift, and this restores the shift relay SH to the position shown to permit energization of the relay EM.

An extra contact 429 on the clear-out button COB is preferably provided for energizing the lower winding of the shift relay SH as shown in Fig. 3B, in order that this relay may be restored to the proper position for regular posting operations in the event that a special message for some reason should not be properly terminated by the end-of-message character, and the system should be locked up by the operation of the over-feed relay OFT, with relay SH in the wrong position.

In this way, the organization of this invention enables special messages regarding the movement of flights, in addition to prescribed posting and wipe-out messages, to be brought directly and definitely to the attention of the operator for such action as may be appropriate, and serves to segregate such significant messages from the wide variety of teletype messages that are ordinarily sent into a central office in connection with the movement of airplanes. This particular feature, of course, as well as some of the other facilities provided by the system as disclosed, is optional, and may be omitted without altering the operation of the system in other respects.

*Interlocking conflicting operations.*—Since the posting and wipe-out operations, both manual and automatic, and also the time sequencing operation of the postings utilize the same control buses of the posting panel, it is necessary, in order to avoid conflict and false operation, to provide suitable interlocking means to prevent these conflicting operations from occurring at the same time, with such preference or priority as is considered expedient.

Since the various details in connection with the manual posting and wipe-out operations are shown in the parent disclosure, it is believed unnecessary to include them in this disclosure. However, it may be noted that the relays OP and WOR which are initially energized under manual control, are interlocked so that only one may be energized at a time. Also, these relays have energizing circuits including such contacts that they may not be energized when an automatic posting or wipe-out operation is in progress. Further, these manually energizable relays OP and WOR may not be energized while a sequencing operation is in progress for rearranging the postings in the panel in chronological time sequence.

Figure 1D:
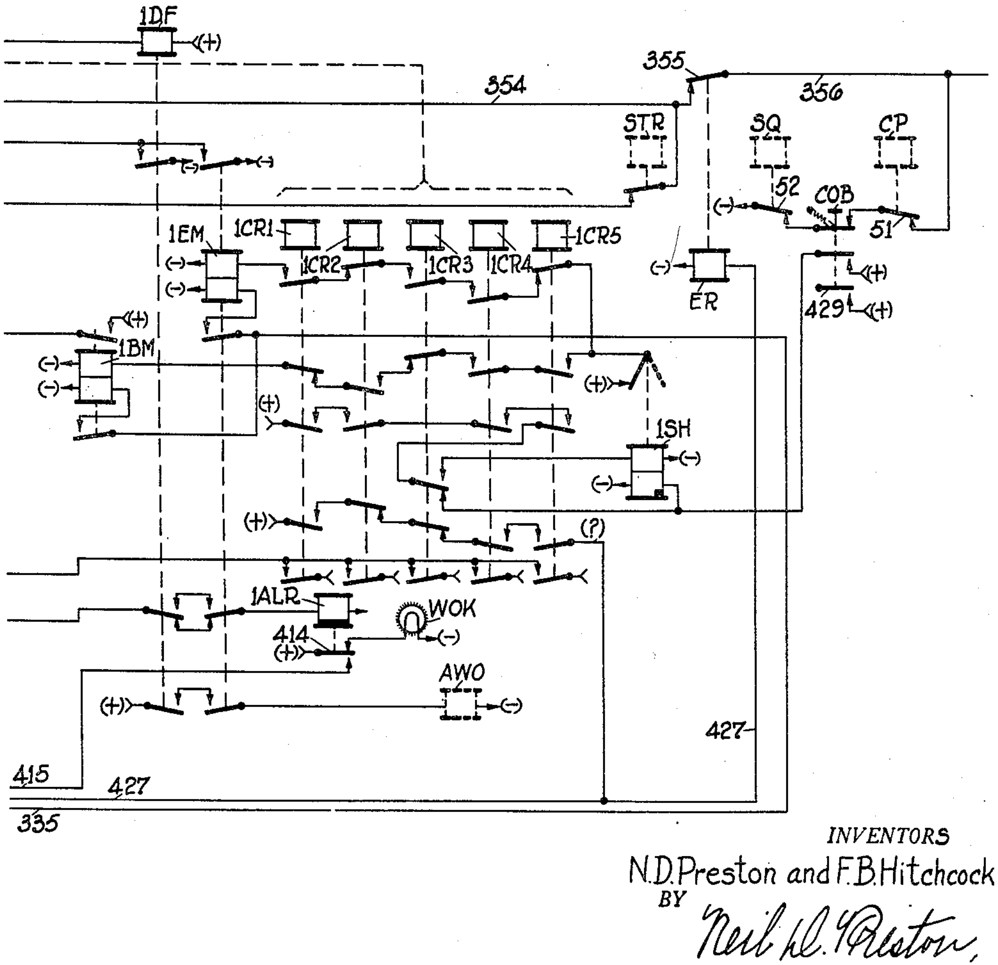

Referring to the start relays STR and 1STR, controlling the automatic posting and wipe-out operations respectively, the connection from (+) to the energizing circuits of both of these relays includes back contacts 345, 346 and 347 of the relays OP, WOR and CPP as shown in Fig. 1C, and the connections to (−) for both of these relays includes a back contact 52 of relay SQ as shown in Fig. 1D, as well as the back contact 51 of relay CP and the clear-out button COB. Consequently, irrespective of the condition of the sag contacts 344 and 348 governing the energization of the relays STR and 1STR, these relays may not be energized while a manual posting or wipe-out, or a sequencing operation is in progress.

Provision is also made for interlocking the energizing circuits for the two start relays STR and 1STR so that either an automatic posting or a wipe-out operation may occur, but not both. As shown, the energizing circuit for the start relay STR includes a sag contact 348 associated with the wipe-out tape and closed only when there is no wipe-out message in this tape. Also, the energizing circuit of relay STR includes the back contact 353 of relay 1STR in Fig. 1C. This arrangement gives wipe-out messages the preference, and postpones the energization of the start relay STR for posting operations until all of the wipe-out messages in the tape have been executed. This preference is provided on the assumption that wipe-out operations are of more significance in keeping the flight data up to date than new posting messages; but of course, the circuits can be arranged in an obvious way to change this preference.

It is contemplated that, while posting or wipe-out messages may be stored in the perforated tapes, the operator may have occasion to make some manual posting; and in order that he may do so, the repeater relay CPP for the completion relay CP is provided to prepare the energizing circuits by closure of its back contact 347 in Fig. 1C for the start relay STR or 1STR, only after energization of the posting relay OP or wipe-out relay WOR is possible upon closure of a back contact of relay CP. With this arrangement, if the operator holds down the push button PB or WOR (not shown), he may initiate a manual posting or wipe-out operation as soon as any automatic operation in progress is ended, in spite of the fact that additional posting and wipe-out messages are stored in the perforated tapes.

Regarding the sequencing operation, it is contemplated that this operation may well be postponed until all posting and wipe-out messages stored in the perforated tapes have been executed, because any one of these stored messages, particularly a wipe-out message, may change the time sequence, and any previous operation of the sequencing means would be premature and unnecessary. Accordingly, the energizing circuit for the relay SA (not shown in detail) for governing the operation of the sequencing relay SQ includes in series sag contacts 145 and 146 closed only if there are no messages stored in either the posting or wipe-out tape. The sag contact 146 for the posting tape is also shunted by front contact 143 of the full relay LF, since the sequencing operation is appropriate when the posting panel is full, even though there are posting messages stored in the perforated tape.

From this explanation and consideration of the circuit connections, it is believed that it can be understood how the necessary interlock between conflicting functions is provided, with certain preferences considered desirable.

In connection with the above description and showing in the drawings, it is assumed that the posting and wipe-out messages are for a particular fix or posting panel as disclosed in the parent application Ser. No. 621,778. For this reason, the typical messages of Figs. 3 and 4 do not include a fixed designating signal. But it should be readily apparent that the messages may be made to include any additional data desired, such as fix designation or the like, so long as each message of a particular class includes a predetermined number of symbols or signals and the distributor for that class has a corresponding number of positions with associated groups of decoding relays.

This decoding of a fix designation in either a posting message or a wipe-out message can then act to determine the particular fix panel of a plurality that shall be governed by the other data of the message.

It should also be understood that any number of different classes of messages may be received and routed to separate perforators for the control of the apparatus associated with a flight progress board or posting panel; and these different sets of receiving and decoding apparatus may be interrelated and interlocked in a manner similar to that disclosed for the apparatus provided for receiving and decoding posting and wipe-out messages, the present embodiment being only for the purpose of illustration of the principles involved.

It is contemplated that over-times may well be reported by radio from the plane to a ground station or airlines office, and then relayed as a teletype message over line facilities to the central control office of the area; and in some cases it may be that most of the overtime reports for the area will be received at the central office in this manner. For this and various other reasons, it is proposed to provide means for automatically posting such overtime messages as are received over the teletype lines without requiring an operator to act as an automaton to set dials in accordance with the message he reads from the tape made by the teletype printer. In the event that some of the overtimes are received directly by radio or telephone at the central office and have to be posted manually, it is assumed that the operator will create a teletype message locally by the actuation of a suitable key board to act through the same teletype instrumentalities as provided herein to automatically effect a posting operation.

Although it is contemplated that overtime messages will usually be received over teletype facilities, and will therefore be readily adapted to automatic posting operations as described and disclosed herein, the particular type of posting and wipe-out control to be provided will depend upon the circumstances encountered in practice. In some cases, the requests for flight clearances may well originate in written form at the control center or be telephoned in, or received over a teletype printer. In any one of these cases, the controller at the control center will calculate and arrange a proposed flight schedule in accordance with the request and such proposed schedule may then be posted in the check display units of the flight progress board in response to the manual actuation of setting dials as specifically disclosed in the above mentioned parent application Ser. No. 641,588 filed January 16, 1946.

On the other hand, it may be desirable in some cases to provide for the automatic posting and wipe-out operations in response to the reception of teletype messages in a manner previously described herein and in our parent application Ser. No. 621,778, now Patent No 2,439,948.

Figures 2B, 5:
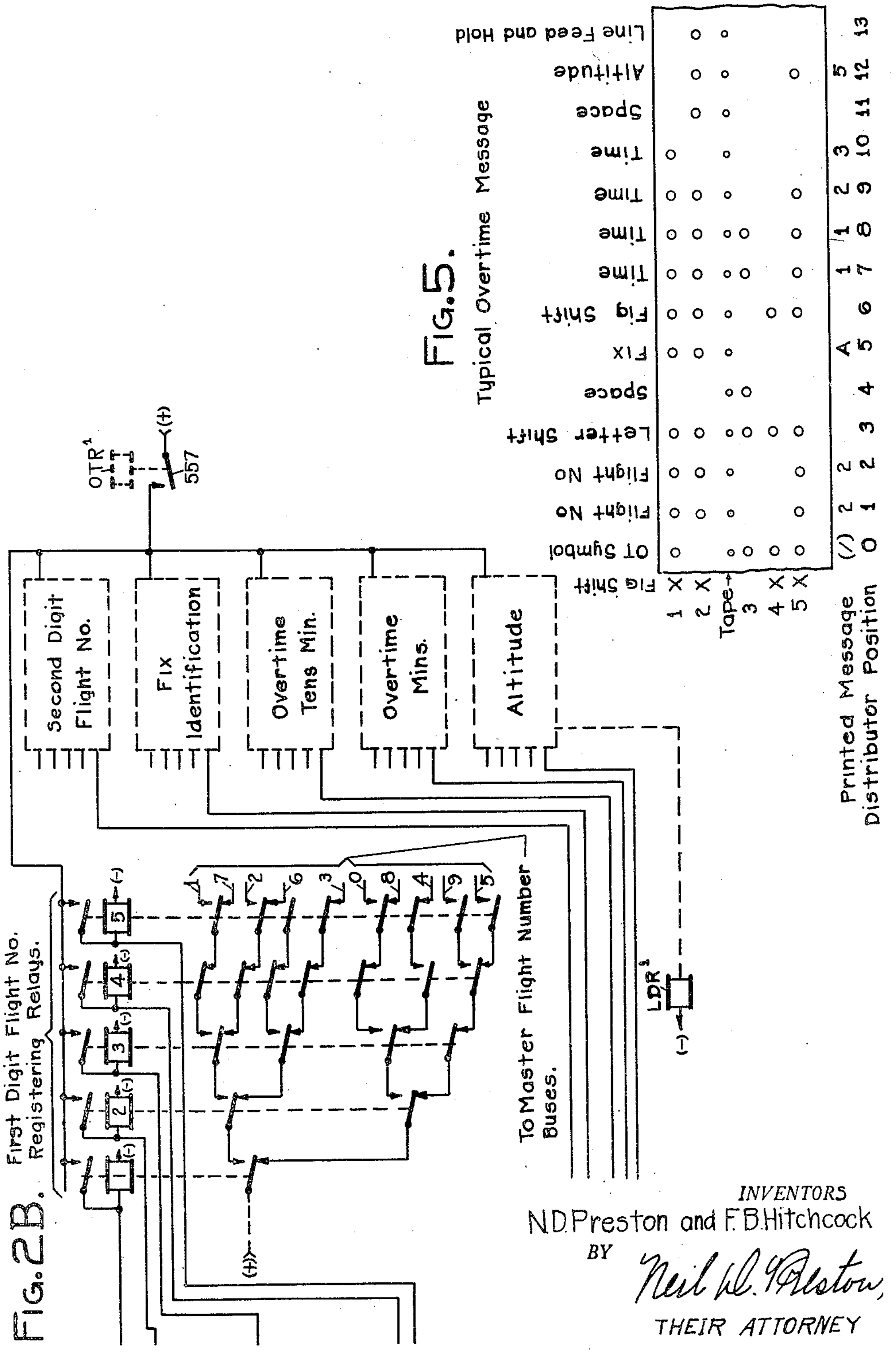
Fig. 5 shows in diagrammatic and table form a typical overtime message received over the teletype facilities as used in the receiving and decoding apparatus shown in Figs. 2A and 2B.

In the first case, the reception and decoding of the overtime messages will be effected by apparatus such as disclosed in Figs. 2A and 2B, which apparatus will then act upon the flight progress board posting panels in a manner described in detail in our parent application 641,588.

In the second case, the provision for the reception and decoding of posting and wipe-out messages as well as the reception and decoding of overtime messages will require coordination between the two sets of apparatus. In fact, it may be desirable in such a case to use the same teletype receiver and route decoding relays to govern the different perforators for the different classes of messages in much the same way that a single teletype receiver and route decoding relays are shown in Figs. 1A through 1D to govern two separate perforators and their associated apparatus. However, it is believed to be sufficient for the purposes of the present invention to disclose and describe the manner in which receiving and decoding apparatus may be employed for overtime messages without considering the details of the manner in which such apparatus might be associated with other receiving and decoding equipment.

With reference to Figs 2A and 2B, it will be noted that the apparatus and circuit organization for receiving and decoding teletype messages for effecting the automatic overtime posting feature of the invention includes in general a teletype receiver, automatic means for segregating the overtime messages from other messages, a tape perforator, a code distributor, a plurality of groups of code registering relays, and the control for governing the posting apparatus in accordance with the message set up in the registering relays the same as if a man had set dials and actuated an overtime button. In addition to this equipment just mentioned, it is also desirable to provide an overtime printer which makes a record of the overtime reports as perforated on the tape for the purpose of giving a permanent record as well as a means for providing readily readable information for an attendant in the event of some error which may cause the automatic posting operation to stall.

It is to be understood that, when the overtime messages are automatically posted as provided by this part of the invention, the automatic wipe-out in the rear of such posting is contemplated to operate the same as previously described in connection with the manual posting of overtime reports, all of which have been shown and described in detail in our parent application Ser. No. 641,588.

*Operation of receiving and decoding apparatus.*—In the conventional stop-start teletype system, the line circuit is normally energized and the normally at rest rotary receiver is set into operation upon the initial deenergization of the line which is indicated in Fig. 2A by the energization of the "start relay" through an obvious circuit including back contact 525 of relay LR and normally closed contacts 526. The code combination for each letter or figure includes the presence or absence of current in the line at each of five points in the revolution of the receiving arm which operates in synchronism with the transmitting arm, and these five code periods are followed by the energization of the line circuit and the stopping of the operation of the rotary receiver. During the rotation of the receiver arm between the fifth position and the normal position in which it is stopped, contacts 527 are momentarily closed for execution of the code combination just transmitted. The off-normal contacts 526 are included in the start relay circuit, as above mentioned, and are maintained open throughout the rotation of the receiving arm so that the closure of back contact 525 between the impulses will not affect the start relay. Also, contacts 528 are normally opened but are caused to close throughout the revolution of the receiving arm so as to maintain energized any of the decoding relays 1, 2, 3, 4 and 5 that may be picked up during a revolution until the receiving arm again reaches its normal position.

Thus, the reception of a conventional code combination results in the picking up of a combination of these decoding relays which are maintained energized until the receiver arm again reaches its normal position; and, while the arm is moving between the position 5 and the normal position, the execution contacts 527 energizes the circuit which has been selected by the particular code combination stored in the decoding relays 1, 2, 3, 4 and 5.

In accordance with the organization of the present invention, means is provided for automatically segregating the overtime messages from the other messages being transmitted over the teletype line facilities, and this is accomplished by providing that the overtime message conforms to a particular pattern. With reference to Fig. 5, it is noted that the typical overtime message includes a figure shift code followed by an overtime symbol, such as an oblique (/); and these combinations of code elements at the beginning of each overtime message acts to cause the apparatus to segregate the overtime messages from all other messages. This apparatus includes a double wound relay SH of the mag-stick type; an overtime symbol relay OTSY; and a line feed code relay LFC. Referring to the typical overtime message of Fig. 5, it is noted that the message proper contains code elements for the different digits of flight number, fix identification, overtime and altitude information as well as suitable space codes to separate the letters and figures on the tape and on the overtime printer. At the end of the message, a line feed code combination is used to pick up relay LFC to restore the overtime message symbol relay OTSY to its normal deenergized condition, as will be presently described.

More specifically, an with reference to Fig. 2A, the relay SH is of the double wound type having polar contacts which are positioned to the right upon the reception of the figure shift code and to the left upon the reception of the letters shift code, and these contacts remain in the positions to which they are last actuated. Assuming that an overtime message is being received, the figure shift code combination stored on the receiver decoding relays 1, 2, 3, 4 and 5 will cause the relay SH to have its polar contact shifted to the right by reason of a circuit closed from (+), and including execution contacts 527, front contact 530 of relay 1, front contact 531 of relay 2, front contact 532 of relay 4, front contact 533 of relay 5, back contact 534 of relay 3, lower winding of relay SH, to (−). At the end of the receiver arm revolution, the receiver decoding relays are deenergized ready for another code combination.

The figure shift code is followed by an overtime symbol code combination, such as the code for an oblique (/), and the reception of this overtime symbol (/) is stored in the receiver decoding relays and causes energization of the relay OTSY by a circuit closed from (+), and including front contact 535 of relay 1, back contact 536 of relay 2, front contact 537 of relay 3, front contact 538 of relay 4, front contact 539 of relay 5, polar contact 540 of the shift relay SH in a right-hand position, winding of relay OTSY, to (−).

The picking up of this relay OTSY is continued by a stick circuit including a back contact 542 of the line feed code relay LFC and front contact 541 of relay OTSY. It is assumed that the relay OTSY is picked up immediately upon the picking up of the relay 5 while the receiver arm is in that position, so as to provide a circuit through front contact 543 of this relay OTSY, while the receiver arm is in the executing position to cause the over-time symbol code combination to be executed to the tape perforator in accordance with the picked up condition of the receiver decoding relays, which, of course, causes a combination of punched holes in the tape as shown in Fig. 5. In this way, each time the teletype receiver receives a series of code combinations belonging to an over-time message, they are transferred to the tape perforator producing a message as shown in a typical way in Fig. 5.

It is noted that the last code combination of the over-time message is what may be termed an end-of-message code (preferably the code used for line feed on page printers and for a period on tape printers) and is used to energize the line feed relay LFC, which, when momentarily energized acts to release the over-time message symbol relay OTSY which in turn disconnects the perforator from the teletype receiver until another over-time message is received.

In accordance with the present organization, an over-time message must conform to the arrangement of codes shown or the apparatus will stall and no automatic posting of an over-time will take place. However, it should be understood that although the apparatus is organized to require the over-time message to conform to a particular arrangement, that various changes in the arrangement of the message can properly be made within the scope of the present invention by merely making corresponding changes in the number of positions and connections to the code distributor.

It may be noted here that a tape perforator is used in this connection for the purpose of storing the over-time reports, since the system may not be ready for posting an over-time just at the instant that the teletype message comes in, and also because the decoding and posting operation may perform at a slower rate and require a longer time interval between the successive messages than would otherwise be employed on the teletype line circuit. In this same connection, the segregation of the overtime messages from other messages on the teletype line circuit provides that the rate of overtime posting does not in any way interfere with the reception of the other types of messages of the line circuit, such as weather reports and the like, nor does the presence of such messages on the line interfere with the posting of the overtime messages.

Let us assume that an overtime message has been punched in the tape or is in the process of being punched, and that a sufficient sag occurs in the tape to close a sag contact of the usual type; then this sag-contact completes a circuit for the overtime relay $OTR^1$ from (+), through a circuit including back contact 544 of relay HO, normally closed cancel contacts 545 (but capable of being manually opened), back contact 546 of relay CDR, back contact 547 of relay PSTR, back contact 548 of relay ER, tape sag contact 549, normal contacts 550 of the code distributor, windings of relay $OTR^1$, to (−). This circuit is, of course, closed only if the system is in condition for posting an overtime report. For example, a conflict detection and posting operation may be in progress with relay CDR picked up (for reasons explained in application Ser. No. 641,588) opening back contact 546, and if such is the case the relay $OTR^1$ cannot be picked up until such operation is completed. When the relay $OTR^1$ picks up, it closes front contact 551 completing a stick circuit shunting out the normal contacts 550 of the code distributor and the tape sag contacts 549 so that this relay $OTR^1$ (corresponding in function with the relay OTR of Fig. 3C of the parent application) is picked up and stuck up until the overtime posting and wipe-out operation is completed or the apparatus is manually cleared out by the operation of the cancel contacts 545, as will be later explained.

Energization of the relay $OTR^1$ starts operation of the tape feed mechanism by a circuit which is closed from (+), through front contact 552 of relay $OTR^1$, normal contact 0 of arm 6 of the code distributor, contact 553 of the code distributor in a normal position, through the tape feed mechanism, to (−).

The energization of the tape feed mechanism causes the feeding device to operate, which is assumed to control the energization of a feeler magnet FM to lower and raise the contact feelers 561, 562, 563, 564 and 565 into and out of the holes in the tape, and then feed the tape to the next position while the contact feelers are raised. This mechanism thus operates in a step-by-step fashion at a suitable rate dependent upon the operating speed of the other devices involved. In this connection, it should be understood that this step-by-step operation of the tape feed mechanism should be at a rate slower than the tape feeding rate of the tape perforator.

In order to make a suitable printed record of the overtime report, a conventional teletype printer is connected to the five feeler contacts, and distinctively responds to the different code elements represented by the rows of holes punched in the tape. The operation of this printer requires certain codes in the message for shifting from letters to figures, and vice versa, and the introduction of spaces for the printed record, although such codes are not introduced for the automatic overtime posting operations. It should also be understood that it is not necessary to have this overtime printer connected to these feeler contacts, but it may be a part of the perforator so as to make the printed record at the same time as the perforations are made. However, there is the advantage of having it connected to the feeler contacts in that such printer would then show the exact point in the message at which the apparatus became stalled if a failure occurred. It is also used to control by its decoding apparatus, the overtime check relay OTC and the error relay ER, as will be described later.

When the first row of holes in the tape of the overtime message comes under the feelers, it of course comprises the combination for the special overtime symbol, and this code is delivered to the overtime printer and suitable decoding contacts (not shown) are closed to momentarily energize a relay OCT. The picking up of relay OTC completes a stick circuit from (+), through front contact 552 of relay $OTR^1$, contact arm 6 of the code distributor in its position 0, front contact 554 of relay OTC, tape feed contacts 555, front contact 556 of relay OTC, windings of relay OTC, to (—). This relay OTC also closes a circuit through the lower front contact 554 of this relay to energize the stepping magnet STM for the code distributor; and when the contact feelers are lifted for the next step and the tape feed contacts 555 open, the stick circuit for relay OTC is opened which deenergizes the stepping magnet STM causing the distributor to move its contact arms to the first active position 1. This code distributor has arms 1, 2, 3, 4 and 5 corresponding with the five elements of the code and these arms are connected directly to the feeler contacts 561, 562, 563, 564 and 565 respectively associated with the tape feeding mechanism. The closure of the feeler contacts in the combination for the overtime symbol (/) occurs while the code distributor is in position 0, so that no operation is effected by the supply of energy to the arms 1 to 5 at such time.

As soon as the code distributor moves out of the normal position 0 to position 1, this initiating circuit is opened by the contact arm 6 and the further energization of the stepping magnet STM is dependent upon the tape feed contacts 555 which are closed by the tape feed mechanism each time the contact feelers are lowered into the holes punched in the tape and is opened each time these contacts are raised so that the code distributor moves its contacts to new positions while the tape is in movement and the feeler contacts are raised. It should be noted that the code distributor actually moves only upon deenergization of its stepping magnet STM.

The dropping of the relay OTC closes back contact 556 which now completes a circuit for the tape feed device from (+), through a circuit including front contact 552 of relay $OTR^1$, contact arm 6 of the code distributor in position 1, back contact 556 of relay OTC, contact 553 of the code distributor in a right-hand position, through the tape feed mechanism, to (—). The contact 553 moves to the right-hand position as soon as the code distributor leaves its position 0 and is restored to its left-hand position only when the code distributor is restored to position 0. Thus, the tape feed mechanism continues its operation after the initial movement of the code distributor only if the relay OTC releases. When the contact feelers enter the next code combination punched in the tape (indicated for the distributor position 1 in the typical overtime message of Fig. 5), the registering relays 1, 2, 3, 4 and 5 for the first digit of flight number (see Fig. 2B) are caused to be picked up in accordance with that combination for the first digit of the flight number. For example, the feeler contacts 561, 562 and 565 are closed for the flight number 2 assumed for the first digit, while feeler contacts 563 and 564 are held open because of the absence of perforations in the tape. The feeler contact 561, for example, supplies energy (+) to arm 1 of the code distributor, which in position 1 energizes the registration relay 1 for the first digit of flight number (see Fig. 2B). In a similar way, the registration relays 2 and 5 of this group for the first digit of flight number are picked up so that the contacts of this group of registration relays will select the bus 2 for the flight number assumed. These relays being picked up in combination for this digit of the flight number are maintained picked up by stick circuits including front contact 557 of relay $OTR^1$. While this is occurring, a circuit is closed from (+), through front contact 552 of relay $OTR^1$, arm 6 of the code distributor in position 1, contact 555 on the tape feed mechanism, through the stepping magnet STM, to (—), but as soon as the tape feed mechanism operates to move the feeler contacts out of their released positions and opens contacts 555, the stepping mechanism STM is deenergized and the code distributor operates to the position 2.

With the code distributor in the position 2, the registering relays 1, 2, 3, 4 and 5 (not shown but indicated by a dotted rectangle) for the second digit of flight number are respectively connected to the feeler contacts 561, 562, 563, 564 and 565 by the arms 1, 2, 3, 4 and 5 respectively of the code distributor, so that the lowering of certain feeler contacts into the corresponding holes of the tape selectively energizes the registering relays of the second digit of the flight number in accordance with the particular code combination. These registering relays for the second digit of flight number also have stick circuits including front contact 556 of relay $OTR^1$. At the same time, the tape feed contact 555 is closed and energizes the stepping magnet STM. After a time interval determined by the speed of operation of the tape feed mechanism, the feeler contacts are raised and the contact 555 opens deenergizing the stepping magnet STM and moving the code distributor contact arms to their next position 3.

This operation continues step by step until all of the essential code elements of the overtime message have been transferred to their respective sets of registering relays, it being noted that, for the space and shift code combination, the position contacts of the arms 1, 2, 3, 4 and 5 of the code distributor are blank or vacant, but that the position contacts for each of the essential code combinations, such as fix identification, time and altitude, are connected to their respective registering relay banks. This means that no connections are made to the arms 1 to 5 of the code distributor for its positions 3, 4, 6, 11 and 13. Also, it will be noted that only the unit minutes and tens of minutes of the overtime are assumed to be posted, although the overtime report includes the unit hours and tens of hours digits. Thus, the arms 1 to 5 of the code distributor also have their positions 7 and 8 vacant, but it is to be understood to be within the scope of the invention that the unit house and tens of hours for an overtime may also be posted in which case suitable banks of registration relays would be controlled from these positions of the distributor in a manner that will be readily understood by analogy to the organization specifically shown.

The step-by-step operation of the tape feed mechanism, the code distributor, and the setting up of the respective code combinations on the registering relay banks continues until the altitude code combination has been stored and the tape feed mechanism opens the contacts 555 moving the code distributor to its position 13 at which time the line feed code combination comes under the feeler contacts. With the code distributor in this thirteenth position, the circuit for the tape feed mechanism is opened as well as the circuit for the stepping magnet STM so that both the tape feed mechanism and the code distributor mechanism stop at this thirteenth position. It might be noted here, that to get to this position, it may have been necessary for the tape feed mechanism to pull tape without perforated code combinations from the perforator device which is assumed to have a ratchet feed to allow for this operation which will occur in the event that a no following overtime message has been received.

If desired, the tape perforator may be of the type shown in the Patent No. 2,252,852 granted August 19, 1941, to Ray Hoover, in which means is provided for automatically feeding out blank tape after the reception of each message, thereby making it unnecessary to pull tape through the perforator to bring the last row of holes of a message under the feelers. When this type of tape perforator is employed, the amount of blank tape fed out after a message is adjusted to be just sufficient to allow the last row of punched holes for that message to come under the feelers 561—565 as is determined by the distance between the perforator punches and the feelers. This automatic feeding of the blank tape at the end of a message does not act to unnecessarily close the sag contact 549, because the extra tape is used up by the tape feed mechanism to bring the last row of holes of that message under the feeler contacts 561—565.

As above mentioned, the picking up of the relay $OTR^1$ by the tape sag contacts 549 is the same as the manual operation of button OTB effecting the picking up of the corresponding relay OTR in Fig. 3C of the parent application Ser. No. 641,588, while the positioning of the code registering relay banks is the same as the manual positioning of the respective dials by an overtime operator but these operations do not cause a posting of the overtime until on the twelfth step of the code distributor, when code registering relays for the altitude are properly picked up.

Referring to Fig. 2B, the contacts of the code registering relays for the first digit of flight number are connected to the master flight number buses for the first digit to replace the contacts of the flight number dial OFN—1 of Fig. 3C of the parent application Ser. No. 641,588. This Fig. 2B shows all ten combinations which the registration relays may assume to select through their contacts any given one of the buses 0 to 9. Also, the energy (+) supplied to these contacts is assumed to be properly selected as required. Similarly, the contacts of each group of registration relays are used to replace the corresponding time, altitude and fix identification dials of Fig. 3C of the parent application Ser. No. 641,588, and energy is assumed to be suitably selected as shown in such figure. In the case of the altitude registering groups, two sets of contacts are required on the registration relays to replace the two sets of contacts on the altitude dial 0—ALT of the parent application Ser. No. 641,588.

When the registering relays for the altitude are set to energize a particular altitude bus, assuming that the altitude, fix and flight number as registered corresponds with the posted flight schedule, then the relay AV (Fig. 3C of parent application) is energized and the overtime as registered on the overtime registering relays is posted in the space in question and is followed by an automatic wipe-out in the rear, in the same manner as in the case of manual control. During the automatic posting operation, relay OTP picks up and energizes relay HO in the regular way. Thus, front contact 558 is closed before back contact 544 opens (see Fig. 2A).

At the end of this posting operation, the release of the relay OTP with the relay HO picked up, breaks the stick circuit for the relay $OTR^1$ at the front contact 558 and drops this relay $OTR^1$ to restore the stick relays of the registration relay banks to their normal condition, see contact 557 of Fig. 2B) as well as deenergizing the buses to permit a wipe-out operation to be effected. Also, the code distributor is advanced from its thirteenth holding position to the initial position 0 by an operating circuit for stepping magnet STM closed through its own back contact 570, a back contact 571 of relay $OTR^1$, and a contact 572 of the code distributor which is opened only when the code distributor is in its normal position 0. The relay $OTR^1$, however, cannot be picked up again until after the wipe-out operation is completed and the relay HO releases, as described in connection with the manual overtime and wipe-out operation in the parent application Ser. No. 641,588, whereupon a similar automatic posting and wipe-out operation may again take place if another overtime message has been punched in the tape.

This proposed organization affords a desirable check upon the accuracy and integrity of the overtime messages because each overtime teletype message must include the correct number of characters in the proper predetermined pattern or the automatic posting operation will not occur due to the lack of correspondence in flight number, fix identification, or altitude as the case may be. For example, if the operator in making up the overtime message should leave a code character out of the standard pattern, or a code character is lost in transmission, then the code character for the altitude comes in the wrong position of the code distributor and there is no energization of the altitude verification relay AV (not shown) to initiate the automatic overtime posting operation. Similarly, if the message as received and punched should include an extraneous character for some reason, the code for the altitude would not occur on the position 12 of the code distributor and there would be no energization of relay AV (not shown). In other words, if an overtime message is utilated, the posting operation fails, the alarm (see Fig. 3C of parent application) is sounded because the overtime operation does not occur within a limited time, and manual intervention is necessary to return the system to normal operation.

It is contemplated that, in the case of such a mutilated message, or in the case of a complete message which gives the wrong fix, flight number or altitude for proper posting, the attending operator upon hearing the alarm can examine the overtime message as it has been printed by the overtime printer and then ask for a repeat from the appropriate sending station. In some cases, it may be possible for the operator to provide a corrected message himself for posting where the error is obvious from an examination of the flight progress board, or he may take such other action as may be expedient. However, before a subsequent or corrected message can be posted, the system must be cleared out, that is, restored to normal conditions. To do this, the operator opens the cancel contacts 545 (see Fig. 2A) to release relay $OTR^1$, whereupon the registering relay banks are deenergized and the code distributor is automatically restored to its initial position by reason of its own off-normal contact 572, and back contact 571 of relay $OTR^1$ supplying energy to back contact 570 and the windings of the stepping magnet STM of the code distributor. As soon as the normal position of the code distributor is reached, the contact 572 opens and the code distributor stops in that position in readiness for operation by the next message when the special overtime symbol marking the beginning of that message is brought under the feeler contacts by the tape feed mechanism.

A somewhat special operation is involved under the circumstances where an overtime message is short one or more code characters. For example, it may happen that the rows of punched holes for a second message may immediately follow the mutilated short message on the tape, so that if the tape were operated for the full thirteen steps, part of the second message would be drawn under the feelers, thereby mutilating the second message although it presumably is correct. To avoid this mutilation of a message merely because the first message has been short a character, the operating circuit for the tape feed mechanism, once the distributor has been moved from its initial position, includes the back contact 556 of relay OTC; and if the first message is short and the overtime symbol marking the beginning of the second message occurs, the relay OTC is immediately energized by suitable circuits (not shown but controlled by the overtime printer) and stops the tape feed mechanism as well as the distributor even though it has not reached the thirteenth holding position. This leaves the feeler contacts in the holes representing the overtime symbol so that when the attendant manually releases the relay $OTR^1$, by opening cancel key contacts 545, the dropping of this relay $OTR^1$ restores the registering relay banks and the code distributor to its initial position. The tape feed mechanism and the distributor are then in readiness to be initiated by the then existing energization of the relay OTC, assuming that the relay $OTR^1$ is again picked up due to the tape sag contacts 549 when the cancel contacts 545 are restored. Thus, the tape feed mechanism and code distributor start operation in synchronism with the first row of holes in the tape constituting the second overtime message.

In this way, mutilated overtime teletype messages are automatically detected and brought to the attention of an operator, and furthermore, the mutilation of one message will not prevent the proper decoding of subsequent messages even though these messages are transmitted in quick succession and are punched in the tape without any intervening blank paper.

Since the overtime messages transmitted by teletype in the manner under consideration are likely to be made by actuation of a typewriter keyboard in the usual way, and are thus subject to error, it is proposed to provide means to enable mistakes made by a teletype operator to be immediately corrected during the transmission of the message, and thereby facilitate the operation of automatic posting which would otherwise fail for each wrong message and require manual intervention at the receiving end. Assume that the operator typing out a teletype overtime message at a remote point makes a mistake in one digit of flight number or time, and notices his mistake by reference to the printed tape, which is being made at the sending station in the usual way at the same time that the code is being transmitted. The sending operator then actuates the key for some special character arbitrarily selected as presenting a special error or correction code, as for example, the code combination for the character (?), and then repeats the entire overtime message including the special symbol (/) required for an overtime report.

The error code is punched in the tape in the regular way, and then is followed by a new series of punched holes representing the correct message. When the tape is fed through the feeler contacts of the retransmitter, the error code combination causes the momentary energization of an error relay ER in a suitable manner, indicated by the dash line as connected to and controlled by the overtime printer. In other words, this relay ER, as well as the relay OTC, may be suitably controlled by the decoding means of the overtime printer so as to be momentarily energized when the proper code combination comes under the feeler contacts, or separate decoding means may be employed if desired. The energization of this error relay ER drops the overtime relay $OTR^1$ to release all registering relay banks then picked up and thereby wiping out all of the previously stored message and stopping operation of the tape feed mechanism. At the same time, the release of the relay $OTR^1$ closes a circuit through its back contact 571, as previously pointed out, to restore the code distributor to its normal position in readiness for another message. As soon as this normal position is reached, the stick circuit for the relay ER is opened by off-normal contacts 573. In this way, all of the parts are restored to the initial condition ready to decode the corrected message upon energization of the relay $OTR^1$. Thus, it is possible for the sending operator at a remote point to correct the errors which he has made and thereby eliminate the necessity of manual intervention at the receiving end except for errors occurring in actual transmission.

It may be that a report of a landing flight will be transmitted over the teletype facilities to the central office of the control area, the overtime of the flight at the last radio fix already having been posted, such report of a landing flight is arranged to automatically effect the wipe-out of the schedule and overtime posting for the fix panel where such flight last reported. Such a report will be in the usual form of the overtime report giving the flight number, the fix identification, the time and altitude of the flight, but in this case the altitude will be a special teletype code reporting that the plane has landed which for convenience may be termed zero altitude.

This code for the altitude is effective through the medium of the altitude registering relays to pick up the landing flight relay LDR[1] (see Fig. 2B), which relay then functions with the relay OTR[1] to initiate the wipe-out operation, as previously described in detail in connection with Figs. 3A, 3B and 3C in the parent application Ser. No. 641,588, assuming of course that the registering relay banks of Figs. 2A and 2B are taking the place of the setting dials of said Fig. 3C. Also, the fix identification in such a landing report would be the code designation of the landing field adjacent the radio fix where the plane left the airways, and this code controls the fix registering relays to select the fix panel corresponding to said adjacent radio fix. This not only gives proper wipe-out control of the panels but also provides that a record is made of the destination and time of arrival of the flight on the teletype printer.

Thus, a rather complex organization has been shown and described for facilitating the scheduling and control of flights over the airways of a control area. Although it is contemplated that a complete system of air traffic control will include not only the features of the present disclosure but also those disclosed in the parent applications Ser. No. 641,588 filed January 16, 1946, and Ser. No. 621,778 filed October 11, 1945, now Patent No. 2,439,948, it should be understood that the features and component parts of the invention disclosed in this application may be used in various combinations and sub-combinations, with or without the features disclosed in the parent applications. It should also be understood that certain features of the present disclosure may be omitted without detracting from the utility of the various other portions of the system.

Having thus described one form of a receiving and decoding organization for teletype messages, as one specific embodiment of the present invention, it is to be understood that various modifications, adaptations, and alterations may be applied to meet the requirements of practice without in any manner departing from the spirit or scope of the invention except as limited by the appended claims.

What we claim is:

1. In a system for receiving messages of a plurality of different classes over a single communication channel, each message starting with a distinctive code signal representing the class of that message, a single message receiving distributor operable through a cycle of operation for each code signal of any message received over said communication channel, a plurality of tape perforators each assigned to a different one of several different classes of messages, a plurality of preselecting devices one for each perforator connected with said distributor, each of said preselecting devices acting when in an actuated condition to render its perforator responsive to the message being received over said communication channel, and circuit means responsive to the first code signal of the messages for actuating the particular perforator for that class of message in accordance with the remaining code signals of such message, said circuit means also being responsive to a code signal at the end of the messages for restoring the actuated preselecting device and rendering ineffective the particular perforator then selected.

2. In a system for receiving messages of different classes over a teletype line circuit, a message receiving distributor operable through a cycle of operation to distribute the code elements of each code symbol to selected ones of a plurality of storage devices, a plurality of storage devices operable to different positions during each cycle of operation of said distributor depending upon the code received during that cycle, a plurality of perforators each assigned to different classes of messages said messages having a first code symbol representative of the class of message and an end-of-message symbol, a plurality of preselecting relays one for each perforator, circuit means governed by said storage devices during the first code symbol received by said distributor and characterizing the class of the message for operating the preselecting relay for the perforator for that class of message, thereby rendering that selected one of said perforators effective to receive code symbols from said line circuit throughout the remainder of that particular message, and circuit means governed by operation of said storage devices by the end-of-message symbol for restoring the preselecting relay then operated, whereby the character of the code signal at the beginning of each message determines the particular perforator to which that message will be routed.

3. In a system for receiving teletype messages transmitted over a line circuit having a plurality of different classes of messages transmitted thereover, each of said messages comprising a plurality of distinctive code signals, a message receiving distributor operable through a cycle of operation for each code signal received over said line circuit and constituting a portion of a complete message, a plurality of perforators each assigned to a particular one of several different classes of messages and operative to punch combinations of holes in a tape in accordance with the character of said code signals forming a message, a single group of storage relays, circuit means governed by said distributor for selectively energizing said relays in accordance with the pulses constituting a code signal then being received by said distributor and maintaining said relays thus selectively energized until the end of that cycle of operation of said distributor, a plurality of selecting relays one for each of said perforators, circuit means controlled by said storage relays in response to the reception of a particular code signal characterizing the particular class of the ensuing message for actuating the corresponding selecting relay to an active position, said circuit means also being controlled by said storage relays in response to a particular end-of-message signal to actuate any selecting relay then in an active position to its normal inactive condition, and circuit means associated with each perforator for rendering it responsive to the code signals being received over said line circuit only when its associated selecting relay is in an active position.

4. In a system for receving teletype messages transmitted over a line circuit having a plurality of different classes of messages transmitted thereover, each of said messages comprising a plurality of distinctive code signals, a message receiving distributor operable through a cycle of operation for each code signal received over said line circuit and constituting a portion of a complete message, a plurality of perforators each assigned to a particular one of several different classes of messages and operative to punch combinations of holes in a tape in accordance with the character of said code signals forming a message, a single group of storage relays, circuit means governed by said distributor for selectively energizing said relays in accordance with the pulses constituting a code signal then being received by said distributor and maintaining said relays thus selectively energized until the end of that cycle of operation of said distributor, a two-position stay-where-put polarized relay for each of said perforators, circuit means controlled by said storage relays when they are positioned by one distinctive code signal characteristic of a particular class of message at the beginning of that message for actuating a selected one of said polarized relays to one position but acting when said storage relays are energized in accordance with a distinctive code signal characteristic of the end of a message for actuating both said polarized relays to the opposite position, and circuit means governed by each of said polarized relays when in said one position for causing its particular one of said perforators to be rendered effective for the reception of the code signals constituting the message then being received.

5. In a system for receiving teletype code messages each being formed by a predetermined number of code signals, a message receiving device operable through different cycles of operation, one for each different code signal, a plurality of perforators each assigned to a particular one of several different classes of messages, circuit means for rendering the proper one of said perforators effectively governed by said message receiving device only when a message of its class is received, a plurality of tape transmitters one for each of said perforators for energizing circuits in accordance with the signals of any message stored in a tape by its associated perforator, means for initiating each of said tape transmitters when its associated perforator has operated to store a message in a tape, said means for the different tape transmitters being interlocked to allow only one tape transmitter to be initiated into operation at the same time, a plurality of groups of storage relays one for each code signal of a message, and circuit means adapted to be governed by any one of said tape transmitters for controlling said storage relays in accordance with the circuits energized by the tape transmitter then in operation, whereby said storage relays can be used in common with said different tape transmitters since only one tape transmitter can be operated at the same time.

6. A system for receiving and decoding teletype code messages each consisting of a predetermined number of code signals relating to items of flight data or the like comprising in combination, a line circuit, a code receiver connected to said line circuit, a tape perforator, said code receiver and said perforator cooperating to punch successive rows of holes in a tape to conform with the code signals of each message in turn as received, a tape transmitter located adjacent said perforator for receiving the punched tape from said perforator and including stepping mechanism for advancing said tape step by step through said transmitter, said transmitter including contacting means for establishing combinations of circuit energization corresponding with the arrangement of holes in the successive rows, a sag contact operated when said perforator operates to punch holes in the tape for a new message and a sag develops in the tape extending to said transmitter, a plurality of code registration units one for each of the respective code signals of said messages, a distributor operable to distribute in a fixed order said combinations of circuit energization to said code registration units for governing the operation thereof, means for initiating operation of the stepping mechanism of said transmitter automatically by operation of said contact after said perforator has been operated, means controlled by said sag contact and by said contacting means of said transmitter for maintaining its stepping mechanism in operation until the last row of holes of the last message punched in said tape has been brought into operative position in said transmitter, other means actuated by said contacting means of said transmitter for delaying initiation of the operation of said distributor when operation of said transmitter is initiated by said sag contact and blank tape is being stepped through said transmitter until the first row of holes of the new message is brought into operative position in said transmitter, whereby operation of said distributor is started in synchronism with the movement of the first row of holes of each message punched in the tape regardless of blank tape that may exist between messages.

7. In a system for receiving and decoding teletype code messages, each being formed by a predetermined number of code signals each comprising a distinctive group of pulses, each message starting with a distinctive beginning of message signal and including a predetermined number of successive code elements, a perforator mechanism operated step by step in accordance with the code signals of any message to punch rows of holes in a paper tape for the successive code signals then being received, a tape transmitter associated with said perforator mechanism for receiving the punched tape and for energizing circuits in accordance with the successive combinations of holes punched in the tape, a plurality of groups of storage relays, one for each code signal of any given message, a decoding distributor adapted to be operated through its different positions each for rendering a different group of storage relays governable by said circuits energized by said tape transmitter, means acting when said perforator has stored a message in said tape for initiating the operation of said tape transmitter, and circuit means responsive only to the distinctive beginning of message signal to initiate operation of said decoding distributor in synchronism with said tape transmitter, whereby said decoding distributor renders said storage relays effective to store the data represented by the successive rows of holes in said punched tape.

8. A system for decoding and registering code signals of teletype messages contained in a punched tape and relating to different items of flight data or the like comprising in combination, a transmitter for receiving tape punched in accordance with the successive messages to be registered, each of said messages in the punched tape starting with a distinctive beginning of message code signal to mark the beginning of the significant message including in a fixed order predetermined items of flight data, said transmitter including circuit controlling feelers and step-by-step feeding mechanism to cause operation of said feelers in accordance with the arrangement of holes in the successive rows of holes in the punched tape, a plurality of banks of decoding relays one for each item of the flight data in a message, a distributor for rendering said feelers effective to control the energization of said banks of decoding relays in succession one at a time as said feelers are operated by the successive rows of holes in the punched tape, and means responsive only to said distinctive beginning of message signal for automatically initiating operation of said distributor in synchronism with said transmitter only when a row of holes corresponding with said beginning of message signal is brought into operative relation with the feelers of said transmitter, whereby said banks of decoding relays are controlled in succession in accordance with the data represented by the corresponding successive rows of holes in the punched tape following such beginning of message signal.

9. In a system for receiving and decoding teletype code messages formed by a plurality of code signals, a tape perforator operated step by step to punch a distinctive row of holes in a paper tape in accordance with each successive code signal being received, a tape transmitter associated with said perforator and operable for successively moving the rows of holes in the punched tape to an active position for selectively energizing circuits in accordance with the row of holes then in such active position, a plurality of groups of storage relays, a decoding distributor having a plurality of positions one for each of said groups of storage relays for rendering that group of storage relays energizable in accordance with the particular combination of holes in the punched tape then occupying the active position of said tape transmitter, driving means for said tape transmitter acting to move the tape to position the successive rows of holes in an active position and selectively energize the group of storage relays then rendered responsive to said transmitter by the position of said decoding distributor, means for starting the driving means of said transmitter when said perforator has been operated for a new message, circuit means acting to initiate operation of said distributor to operate in synchronism with said tape transmitter only when the first row of holes of a message are in the active position in said tape transmitter, and means for continuing operation of said transmitter and distributor until the last row of holes of the message has been brought into effective position in said transmitter.

10. A system for decoding and registering code signals of a teletype message in a punched tape relating to different items of flight data or the like comprising in combination, a receiver and a tape perforator cooperating to punch rows of holes in a tape to conform with the items of data in messages to be registered, a transmitter for receiving said punched tape and including stepping mechanism for feeding the tape through the transmitter step by step to bring the successive rows of holes punched in the tape into an operative position in said transmitter to govern the energization of code output circuits, a plurality of registration devices one for each item of flight data in a message, a distributor for connecting said registration devices one at a time in turn to said code output circuits, driving means for said distributor for operating it step by step in synchronism with the stepping mechanism of said transmitter, means for initiating operation of the stepping mechanism of said transmitter when said perforator has been operated to punch rows of holes in said tape for a new message, means for initiating operation of the distributor in synchronism with said transmitter only when the first row of holes of the message is brought into the operative position in said transmitter, and means for continuing operation of the stepping mechanism of said transmitter and the driving means of said distributor until the last row of holes of the message has been brought into operative position in said transmitter even though operation of said perforator has ceased.

11. A system for decoding and registering code signals of a teletype message in a punched tape relating to different items of flight data comprising in combination, a transmitter for receiving tape punched in accordance with the successive messages to be registered, each of said messages in the punched tape having a distinctive beginning of message code signal followed by a plurality of code signals relating to the different items of flight data and terminating with a distinctive end of message code signal, said transmitter including means for moving the rows of holes in the punched tape successively into an active position to govern the energization of code output circuits, a plurality of registration devices one for each item of flight data belonging to a message, a distributor for connecting said registration devices in succession to said code output circuits, driving means for operating said distributor in synchronism with the movement of the rows of punched holes into active position in said transmitter, means for initiating operation of the driving means of said distributor only when the row of holes corresponding to the distinctive beginning of message signal is brought into the active position in said transmitter and thereby actuate said distributor to render said registration devices responsive to corresponding items of flight data as represented by the succeeding rows of holes punched in the tape, and means for continuing operation of said transmitter and distributor until the row of holes corresponding to the distinctive end of message signal is brought into the active position in said transmitter.

12. A system of the character described according to claim 11 comprising, a group of relays selectively energized from the output circuits of the tape transmitter, and separate relays controlled by said group of relays for responding to the distinctive beginning of message signal and end of message signal for governing the operation of the distributor and transmitter.

13. A system for receiving and decoding teletype code messages relating to different items of flight data and the like comprising in combination, a receiver and tape perforator cooperating to punch rows of holes in a tape in accordance with the code signals in messages being received, each message in the punched tape having a distinctive beginning of message signal followed by a predetermined number of code signals relating to the different items of the data and terminating with a distinctive end of message signal, a tape transmitter for receiving the tape as punched by said perforator and including stepping mechanism for advancing the tape step by step and bring the rows of holes punched therein into an active position in the transmitter, a plurality of banks of decoding relays one bank for each item of the data in a message, a distributor for operatively connecting said banks of decoding relays one bank at a time in turn with said tape transmitter to be controlled in accordance with the combination of holes in the row then in operative position in the transmitter, driving means for operating said distributor in synchronism with the stepping mechanism of said transmitter, means acting automatically when the perforator has been operated to punch a new message in the tape to initiate operation of the stepping mechanism of the transmitter independently of operation of the distributor, means effective only when a row of holes corresponding to the beginning of message signal has been brought into an active position in the transmitter to initiate operation of the driving means for said distributor and thereby cause operation of the distributor in synchronism with the movement of the respective rows of punched holes in the tape relating to the items of data into the active position in the transmitter, and means for automatically continuing synchronous operation of the stepping mechanism of the transmitter and the driving means of the distributor until the row of holes corresponding to the end of message signal has been brought into active position in the transmitter, thereby assuring that the complete message will be received and stored in the banks of decoding relays even though operation of the perforator after punching the tape for such message may have ceased.

14. A system for receiving and storing in storage devices the code signals of a teletype message relating to different items of flight data and the like, said system comprising in combination, a receiver and a tape perforator cooperating to punch a series of rows of holes in a tape in accordance with the code signals of the messages to be stored, a tape transmitter for receiving the tape as punched by said perforator and operable to move the tape step by step to bring the rows of holes in the tape successively into an active position in the transmitter, means including a plurality of storage devices and a distributor for storing the code signals represented by the successive rows of holes in a given message as brought into an active position in the transmitter, and automatic control means for said transmitter and distributor acting to initiate operation of the transmitter independently of the distributor when the perforator has been operated to punch a new message in the tape, said control means acting to initiate operation of the distributor in synchronism with the transmitter when the first row of holes of the message is brought into the active position in the transmitter and also acting to continue operation of both the transmitter and distributor until the last row of holes in the message has been brought into the active position in the transmitter even though operation of the perforator may have ceased.

15. A system for registering code signals of a teletype message represented by rows of holes in a punched tape comprising in combination, a tape transmitter for receiving the punched tape and selectively energizing output circuits in accordance with the arrangement of holes in the successive row of holes brought into operative position in the transmitter, each of the messages having a prescribed number of rows of holes respectively relating to different items of data to be registered and terminating with a row of holes representing a distinctive end of message signal, a distributor set into operation when the first row of holes for a message comes into operative position in the transmitter, said distributor operating in synchronism with said transmitter to assume a certain position after the prescribed number of rows of holes for a proper message have passed through the transmitter, and means governed by the energization of the output circuits of the transmitter in accordance with the distinctive end of message signal and concurrent movement of the distributor to said certain position for automatically stopping further operation of the transmitter for subsequent messages and for providing an alarm signal whenever the end of message signal and movement of the distributor to its certain position do not occur simultaneously, thereby manifesting that the message as punched in the tape does not conform with the prescribed pattern.

16. In a system for receiving and decoding teletype code messages formed by a plurality of code signals, a perforator mechanism operated in response to successive code signals to punch successive rows of holes in a paper tape, the holes of each row being a combination characteristic of the corresponding code signal, a tape transmitter associated with said perforator mechanism for receiving the punched tape, said tape transmitter including driving mechanism to operate it step by step independently of the stepping operation of said perforator mechanism, a plurality of groups of decoding relays each group including a plurality of relays operable to different positions in accordance with different code combinations, a decoding distributor having a plurality of positions corresponding to the plurality of groups of storage relays and effective when in a particular position to allow the storage relays of the group for that position to be selectively energized by the tape transmitter in accordance with the particular combination of holes then effective in said transmitter, circuit means for initiating operation of said decoding distributor when a row of holes in said tape enters said transmitter characteristic of the begin-message signal, said circuit means causing said decoding distributor to operate step by step in synchronism with said tape transmitter until a combination of holes enters said tape transmitter corresponding to the end-of-message signal at which time said decoding distributor is in its last position providing the message punched in said tape includes a proper number of code signals, and circuit means for actuating an alarm if the end-of-message code combination enters said tape transmitter either prior to or later than the arrival of said decoding transmitter to its said last position.

17. A system for decoding and registering code signals of a teletype message represented by rows of holes in a punched tape and relating to different items of flight data comprising in combination, a tape transmitter for receiving tape punched in accordance with the messages to be registered, each of said messages having a prescribed number of rows of holes for the different items of flight data and terminating with a row of holes representing a distinctive end of message signal, said transmitter operating to bring the rows of holes punched in the tape in succession into an operative position in said transmitter to govern the energization of code output circuits, a plurality of registration devices one for each item of the flight data, a distributor operated in synchronism with the movement of the rows of holes into operative position in the transmitter for connecting said registration devices for such items of flight data one at a time in turn to said code output circuits, said distributor assuming a certain position after the prescribed number of rows of holes in the punched tape for a proper message have been brought into operative position in said transmitter, an end of message relay operated when the row of holes corresponding to the distinctive end of message signal has been brought into the operative position in said transmitter, and means automatically operated whenever the operation of said end of message relay and the movement of said distributor to said certain position fail to occur simultaneously, thereby manifesting that the message in the tape does not conform to the prescribed pattern.

18. In a system of the character described for decoding and registering code signals of a teletype message in a punched tape relating to different items of data, apparatus for automatically indicating when a message to be registered does not conform to a prescribed pattern due to the inclusion or omission of some code element comprising in combination, a tape transmitter for receiving tape punched in accordance with the various messages to be registered, each of said messages in said punched tape including a row of holes representing a distinctive beginning of message signal followed by a prescribed number of rows of holes relating to different items of data to be registered and terminating with a row of holes representing a distinctvie end of message signals, a plurality of registration devices one for each of said items of data, a distributor for operatively connecting said transmitter with said registration devices one at a time in turn as the rows of holes in the punched tape are brought into an active position in said transmitter, control means for said distributor including relays responsive to said distinctive beginning of message and end of message signal for operating said distributor in synchronism with the movement of the holes in the punched tape into the active position in said transmitter, said distributor assuming a certain position after a prescribed number of signals as represented by rows of holes punched in said tape have passed through the transmitter, and means operated automatically whenever the movement of said distributor to said certain position and the operation of the relay responsive to the end of message signal fail to occur simultaneously, thereby manifesting that the message as punched in the tape does not conform to the prescribed pattern.

19. A system for registering the different items of fligfiht data or the like as received in code from by a teletype receiver comprising in combination, a tape perforator operated by the teletype receiver for punching rows of holes in a tape in accordance with the messages as received, each message in proper form for use comprising a prescribed number of code signals terminating with a distinctive end of message signal, automatic means responsive to said end of message signal and the number of step-by-step operations of the transmitter in moving the successive rows of holes in the punched tape and constituting a message for automatically determining if a message as punched in the tape comprises the prescribed number of code signals, and manually releasable means governed by said automatic means for stopping operation of the transmitter and giving an alarm signal whenever a message as punched in the tape does not conform with the prescribed pattern.

20. In a system for receiving and retransmitting teletype code messages comprising a plurality of code signals, a perforator mechanism operated in accordance with a message being received over a line circuit for punching a combination of holes in a paper tape for each code signal and then stepping said tape to a new position in readiness for the next code signal, said punching and stepping portion of said mechanism including a ratchet feed permitting tape to be pulled through said mechanism when it is not in operation, a tape transmitter associated with said perforator mechanism for receiving the punched tape and energizing circuits in accordance with the successive combinations of holes punched in the tape, and means for operating said tape transmitter step by step to receive the successive code combinations of holes of any message, said means acting when once initiated for a message to continue the step by step operation until all of the punched holes for that message have been received by said tape transmitter, whereby at times said tape transmitter pulls tape through said perforator mechanism while it is not in operation in order that all of the punched holes constituting a message will be received by said tape transmitter although the perforator mechanism has ceased operation.

21. In a system for receiving and decoding teletype messages formed by a plurality of code signals, a perforator mechanism operated step by step to punch successive rows of holes in a paper tape having characteristics in accordance with the successive code signals being received, each combination of holes being punched in response to a code signal and the tape then being stepped to a new position in readiness for the next code signal, a tape transmitter associated with said perforator for receiving the punched tape and energizing circuits in accordance with the successive combinations of holes punched in the tape, circuit means acting when a message has been stored in said paper tape by said perforator for initiating operation of said tape transmitter, and circuit means acting to stop the operation of said tape transmitter and give an alarm when said circuits cease to be successively energized and deenergized.

NEIL D. PRESTON.
FOREST B. HITCHCOCK.

REFERENCES CITED

The following references are of record in the file of this patent:

UNITED STATES PATENTS

| Number | Name | Date |
|---|---|---|
| 1,174,236 | Dixon | Mar. 7, 1916 |
| 2,193,967 | Kleinschmidt | Mar. 19, 1940 |
| 2,200,802 | Morton | May 14, 1940 |
| 2,206,550 | Mordin | July 2, 1940 |
| 2,237,130 | Bryce | Apr. 1, 1941 |
| 2,246,449 | Marshal | June 17, 1941 |
| 2,248,820 | Haselton | July 8, 1941 |
| 2,424,223 | Colman | July 22, 1947 |